United States Patent
Wu et al.

(10) Patent No.: US 11,882,545 B2
(45) Date of Patent: Jan. 23, 2024

(54) RESOURCE HOPPING FOR SIDELINK COMMUNICATION

(71) Applicant: QUALCOMM Incorporated, San Diego, CA (US)

(72) Inventors: Shuanshuan Wu, San Diego, CA (US); Qing Li, Princeton Junction, NJ (US); Tien Viet Nguyen, Bridgewater, NJ (US); Sourjya Dutta, San Diego, CA (US); Kapil Gulati, Belle Mead, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/456,852

(22) Filed: Nov. 29, 2021

(65) Prior Publication Data
US 2023/0171737 A1    Jun. 1, 2023

(51) Int. Cl.
*H04W 72/02* (2009.01)
*H04W 72/20* (2023.01)
(Continued)

(52) U.S. Cl.
CPC ....... *H04W 72/02* (2013.01); *H04W 72/0453* (2013.01); *H04W 72/1263* (2013.01); *H04W 72/20* (2023.01)

(58) Field of Classification Search
CPC ............. H04W 72/02; H04W 72/0453; H04W 72/1263; H04W 72/20; H04W 72/40;
(Continued)

(56) References Cited

U.S. PATENT DOCUMENTS

| | | | |
|---|---|---|---|
| 2020/0008183 A1* | 1/2020 | Chen | H04W 72/20 |
| 2021/0144750 A1 | 5/2021 | Cao et al. | |
| 2022/0225408 A1* | 7/2022 | Lee | H04W 72/20 |

FOREIGN PATENT DOCUMENTS

| | | | |
|---|---|---|---|
| EP | 3902343 A1 | 10/2021 | |
| WO | WO-2021060936 A1 * | 4/2021 | H04L 1/0013 |

OTHER PUBLICATIONS

International Search Report and Written Opinion—PCT/US2022/046612—ISA/EPO—dated Jan. 25, 2023.

\* cited by examiner

*Primary Examiner* — Thai Nguyen
(74) *Attorney, Agent, or Firm* — Procopio, Cory, Hargreaves & Savitch LLP

(57) ABSTRACT

A transmitting user equipment (UE) may perform resource hopping for a periodic sidelink resource reservation by scheduling a plurality of periodic sidelink resources with a first periodicity, the plurality of periodic sidelink resources being shifted at a first offset in a frequency domain. The transmitting UE may reduce persistent collisions of periodic or semi-persistent scheduling (SPS) reservation of the sidelink resources with another UE. The transmitting UE may transmit, to a receiving UE, sidelink control information (SCI) indicating the first offset and the plurality of sidelink transmissions via the plurality of periodic sidelink resources at the first periodicity based on the SCI. The receiving UE may receive, from the transmitting UE, the SCI and the plurality of sidelink transmissions via the plurality of periodic sidelink resources at the first periodicity based on the SCI.

30 Claims, 14 Drawing Sheets

(51) Int. Cl.
*H04W 72/0453* (2023.01)
*H04W 72/1263* (2023.01)

(58) Field of Classification Search
CPC .... H04W 28/26; H04L 5/0012; H04L 5/0044; H04L 5/0091; H04L 5/0053; H04L 5/0094; H04B 1/713
See application file for complete search history.

RESOURCE HOPPING FOR SIDELINK COMMUNICATION

TECHNICAL FIELD

The present disclosure relates generally to communication systems, and more particularly, to sidelink communication including resource hopping for a periodic resource reservation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for wireless communication is provided. The apparatus may include a transmitting user equipment (UE) and a receiving UE. The transmitting UE may perform resource hopping for a periodic sidelink resource reservation by scheduling a plurality of periodic sidelink resources with a first periodicity, the plurality of periodic sidelink resources being shifted at a first offset in a frequency domain. The transmitting UE may reduce persistent collision of periodic or semi-persistent scheduling (SPS) reservation of the sidelink resources with another UE. The transmitting UE may transmit, to a receiving UE, sidelink control information (SCI) indicating the first offset and the plurality of sidelink transmissions via the plurality of periodic sidelink resources at the first periodicity based on the SCI. The receiving UE may receive, from the transmitting UE, the SCI and the plurality of sidelink transmissions via the plurality of periodic sidelink resources at the first periodicity based on the SCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
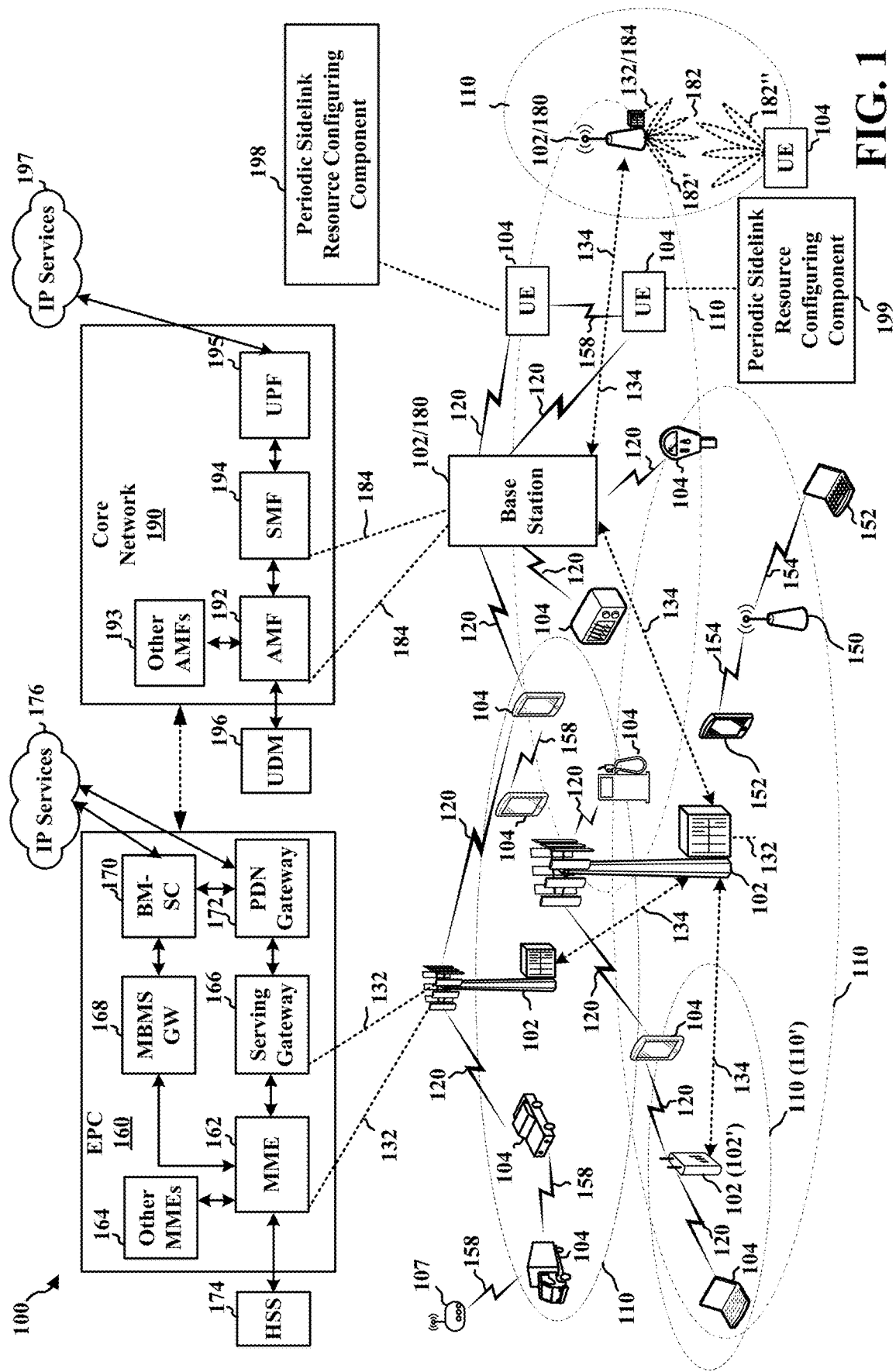
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may be a transmitting UE and include a periodic sidelink resource configuring component 198 configured to schedule a plurality of periodic sidelink resources with a first periodicity for communicating with a second UE at the first periodicity, the plurality of periodic sidelink resources being shifted at a first offset in a frequency domain, transmit, to the second UE, sidelink control information (SCI) including an indication of the plurality of periodic sidelink resources at the first periodicity, and transmit, to the second UE, a plurality of sidelink transmissions via the plurality of periodic sidelink resources at the first periodicity. In certain aspects, a UE 104, or other device communicating based on sidelink, may be a receiving UE and include a periodic sidelink resource configuring component 199 configured to receive, from a first UE, SCI including an indication of a plurality of periodic sidelink resources at a first periodicity, the plurality of periodic sidelink resources being shifted at a first offset in a frequency domain, and receive, from the first UE, a plurality of sidelink transmissions via the plurality of periodic sidelink resources at the first periodicity. Although the following description may be focused on 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2-2, FR4, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
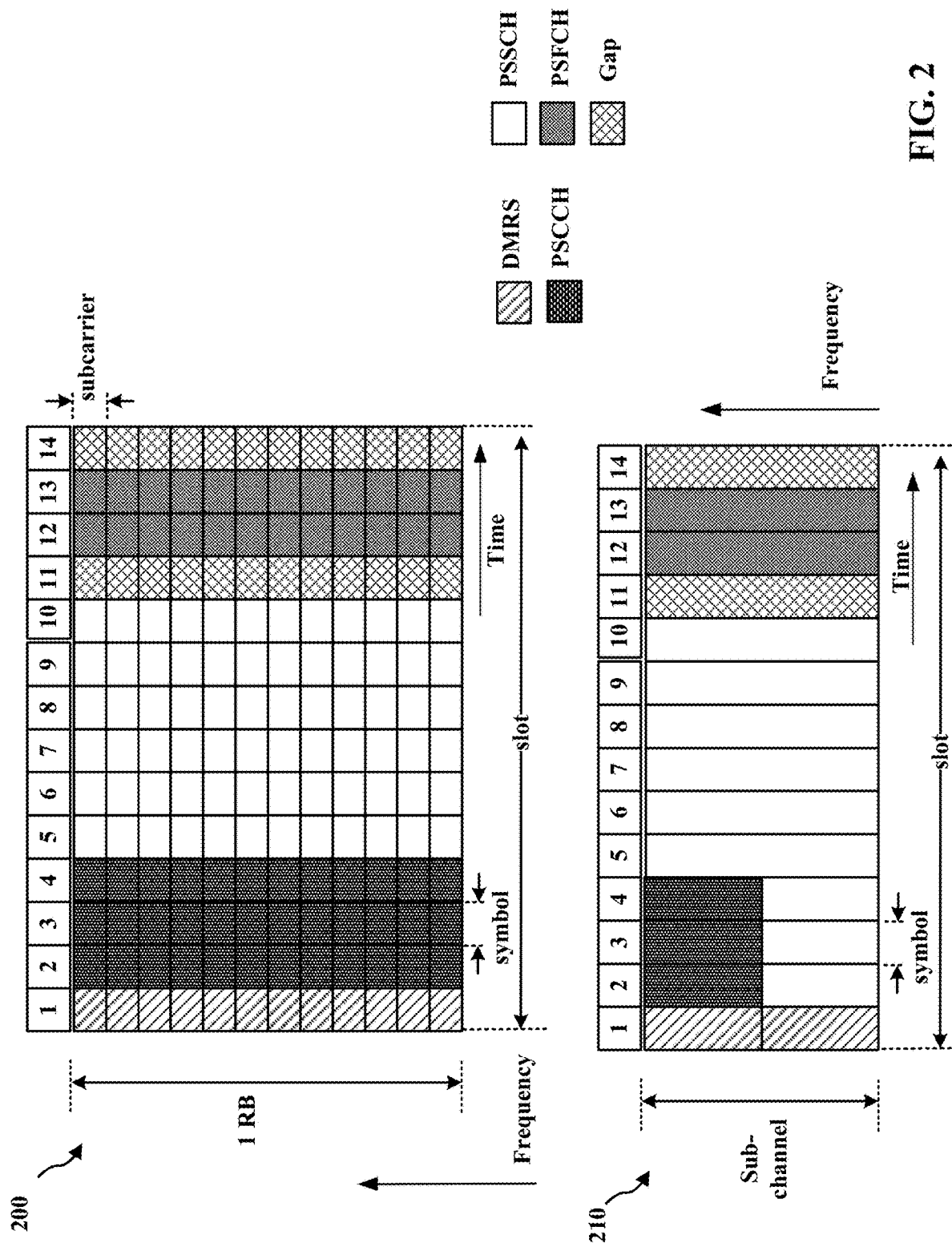
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of SCI, and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some REs may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
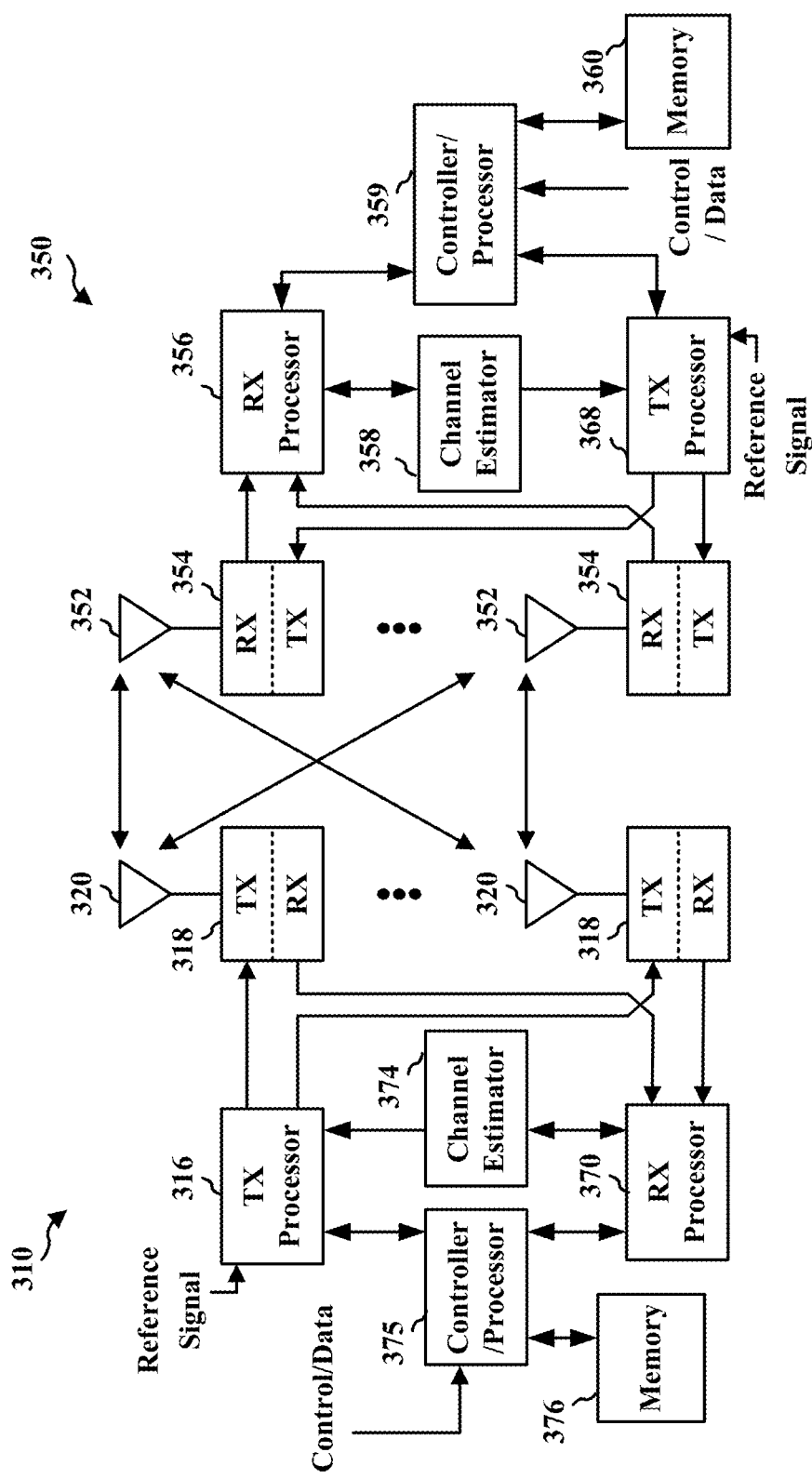
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 368, the RX processor 356, and the controller/processor 359 may be configured to perform aspects in connection with 199 of FIG. 1.

Figure 4:
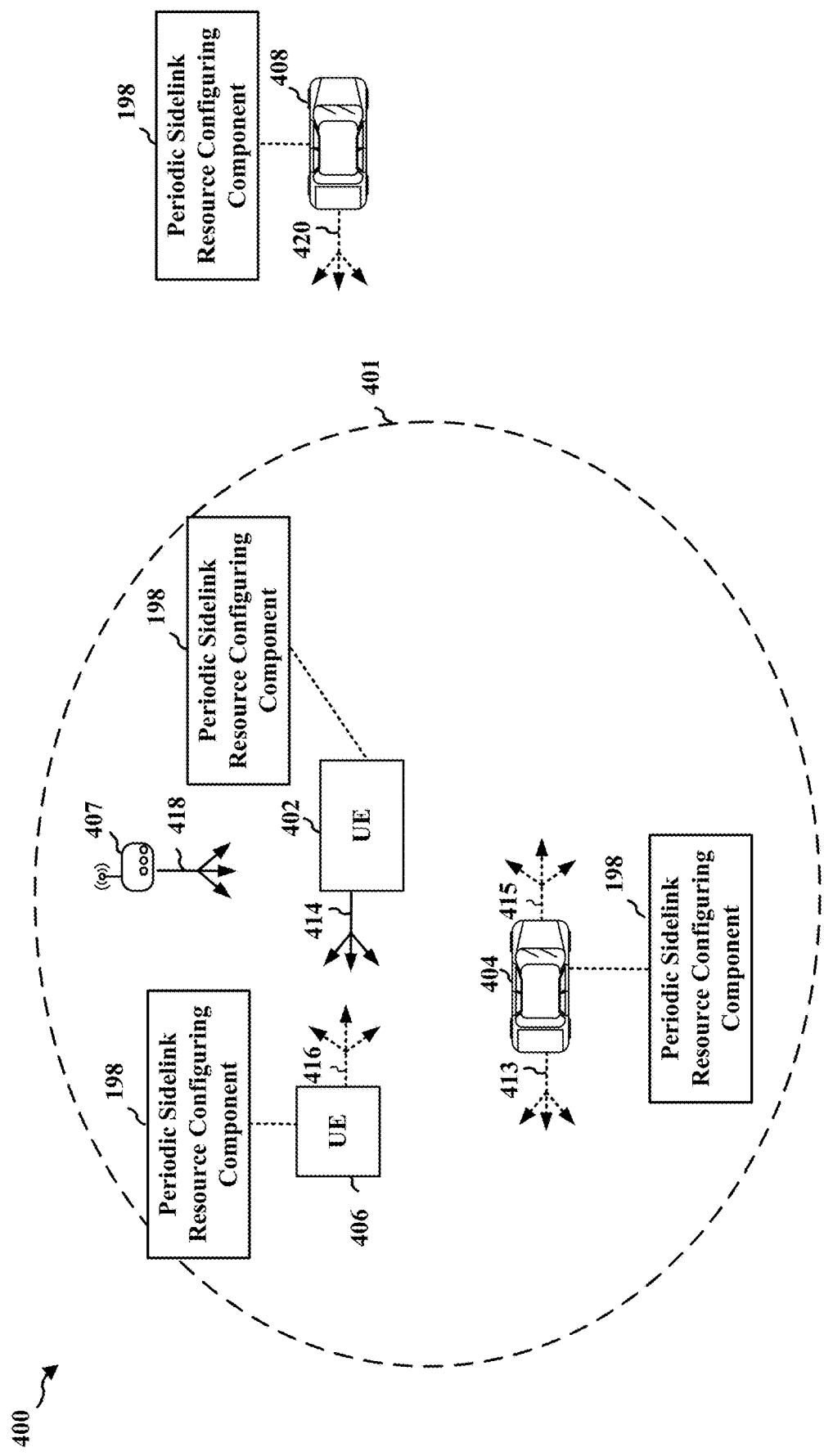
FIG. 4 illustrates example aspects of sidelink communication between devices, in accordance with aspects presented herein.

FIG. 4 illustrates an example 400 of sidelink communication between devices. The communication may be based on a slot structure including aspects described in connection with FIG. 2. For example, the UE 402 may transmit a sidelink transmission 414, e.g., including a control channel (e.g., PSCCH) and/or a corresponding data channel (e.g., a PSSCH), that may be received by UEs 404, 406, 408. A control channel may include information (e.g., SCI) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid or reduce interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit sidelink transmissions 413, 415 intended for receipt by other UEs within a range 401 of UE 404, and UE 406 may transmit sidelink transmissions 416. Additionally/alternatively, RSU 407 may receive communication from and/or transmit communication 418 to UEs 402, 404, 406, 408. One or more of the UEs 402, 404, 406, 408 or the RSU 407 may include a periodic sidelink resource configuring component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. That is, in Mode 1, a base station may allocate sidelink resource to a transmitting UE for the sidelink data channel transmission. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. That is, in the Mode 2, a transmitting UE mayperform the resource allocation on its own, i.e., autonomous resource allocation. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid or reduce collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s). In one aspect, a transmitting UE may be configured to reserve a number of resources in a number of future slots for retransmission within the same TB. For example, the transmitting UE may reserve one or two future sidelink resources for retransmission within the same TB.

In another aspect, the transmitting UE may indicate the repetition of the reservation for transmission within another TB. The indication may indicate a period value of the reservation, and the reservations may be indicated in SCI. In one example, the repetition of the reservation for transmission within another TB may be disabled by a configuration. Here, the reservation for transmission within another TB may be referred to as a semi-persistent scheduling (SPS) reservation or a periodic reservation, e.g., for SPS or periodic traffic transmission.

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding SCI transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
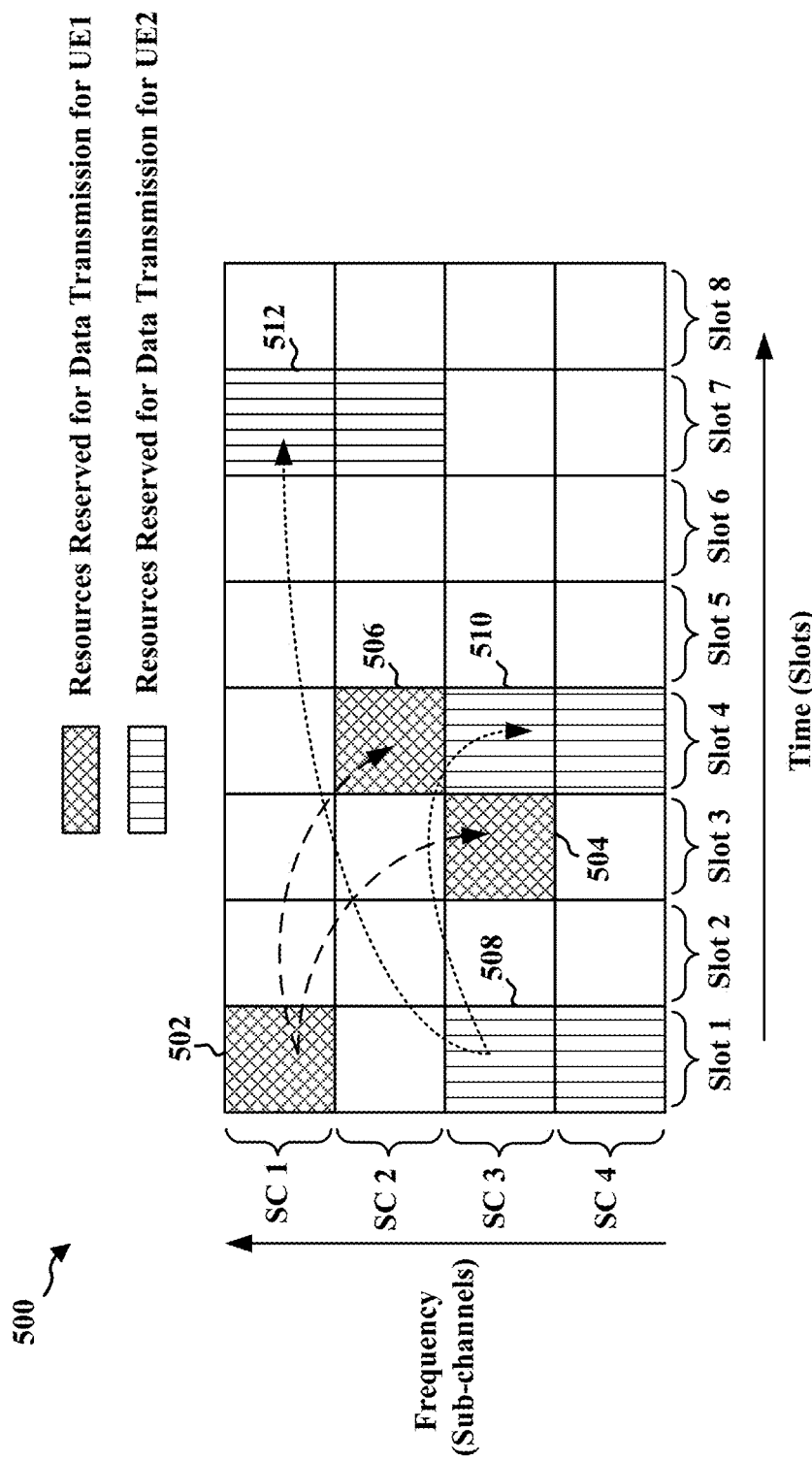
FIG. 5 illustrates examples of resource reservation for sidelink communication.

FIG. 5 is an example 500 of sidelink resources showing reservations for sidelink transmissions. The resources may be included in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1) may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5 illustrates that a second UE ("UE2") reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and/or a single transmission or just for an initial transmission.

The UE may determine an associated signal measurement, e.g., a reference signal received power (RSRP), for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmission 508, first data retransmission 510, and second data retransmission 512.

Figure 6:
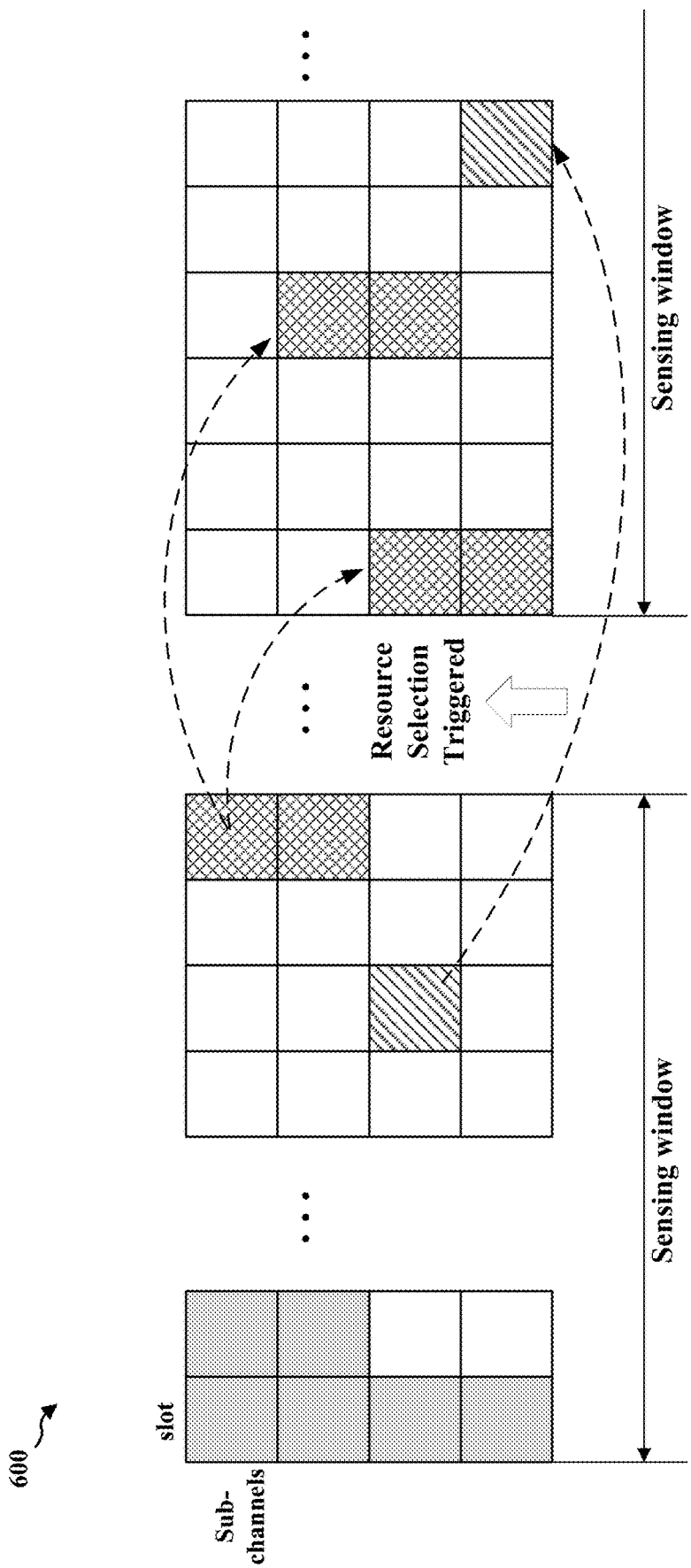
FIG. 6 is an example of sidelink resources showing periodic reservation for sidelink transmissions.

FIG. 6 is an example 600 of sidelink resources showing periodic reservation for sidelink transmissions. That is, the example 600 shows the sidelink resource reservation for transmission of another TB, e.g., the periodic reservation. In one aspect, a set of resource reservation periods may be configured from a set of candidate period values, e.g., in milliseconds (ms). In one aspect, the base station may schedule the sidelink communication, and the set of resource reservation periods may be configured by the base station. In another aspect, the sidelink communication may not be scheduled by the base station, e.g., autonomous communication between UEs, and the UEs may follow a default set of resource reservation periods defined for the data transmitting UE and/or the data receiving UE. That is, the UEs may be configured with a set of RRC parameters for the sidelink communication in case the UEs may rely on cellular network coverage or receive a configuration from the base station. For example, up to 16 resource reservation periods may be configured from the set of candidate period values in ms, e.g., 0, 1-99, 100, 200, 300, 400, 500, 600, 700, 800, 900, or 1000. The data transmitting UE may indicate a reservation period from the set of configured values, e.g., the parameter 'resource reservation period', in a SCI format 1-A, while transmitting the data channel, e.g., the PSSCH. Other UEs decoding the SCI may understand that the same data channel resource in the next one or more periods may be reserved by the transmitting UE for its future sidelink data transmissions.

In some aspects, the periodic reservation may be enabled in the Mode 2, and the transmitting UE may reserve both a number of resources in a number of future slots for retransmission of the same TB, and repetition of the reservation for transmission of another TB, e.g., the TBs in the next one or more periods. The both reservations may be indicated in the SCI, e.g., the SCI format 1-A.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

The periodic resource reservation may be based on sensing. That is, the transmitting UE may decode at least one SCI from other UEs indicating the resource reservations in future slots associated with the other UEs, and based on the resource reservations decoded from the SCI from other UEs, the transmitting UE may determine a set of candidate sidelink resources from the resource selection window for sidelink communication. The transmitting UE may also determine the set of candidate sidelink resources for sidelink communication based on the RSRP measurement. That is, the transmitting UE may exclude the reserved resources having RSRP greater than a threshold RSRP value. From the set of candidate sidelink resources, the transmitting UE may randomly select the resources for periodic reservation.

Figure 7:
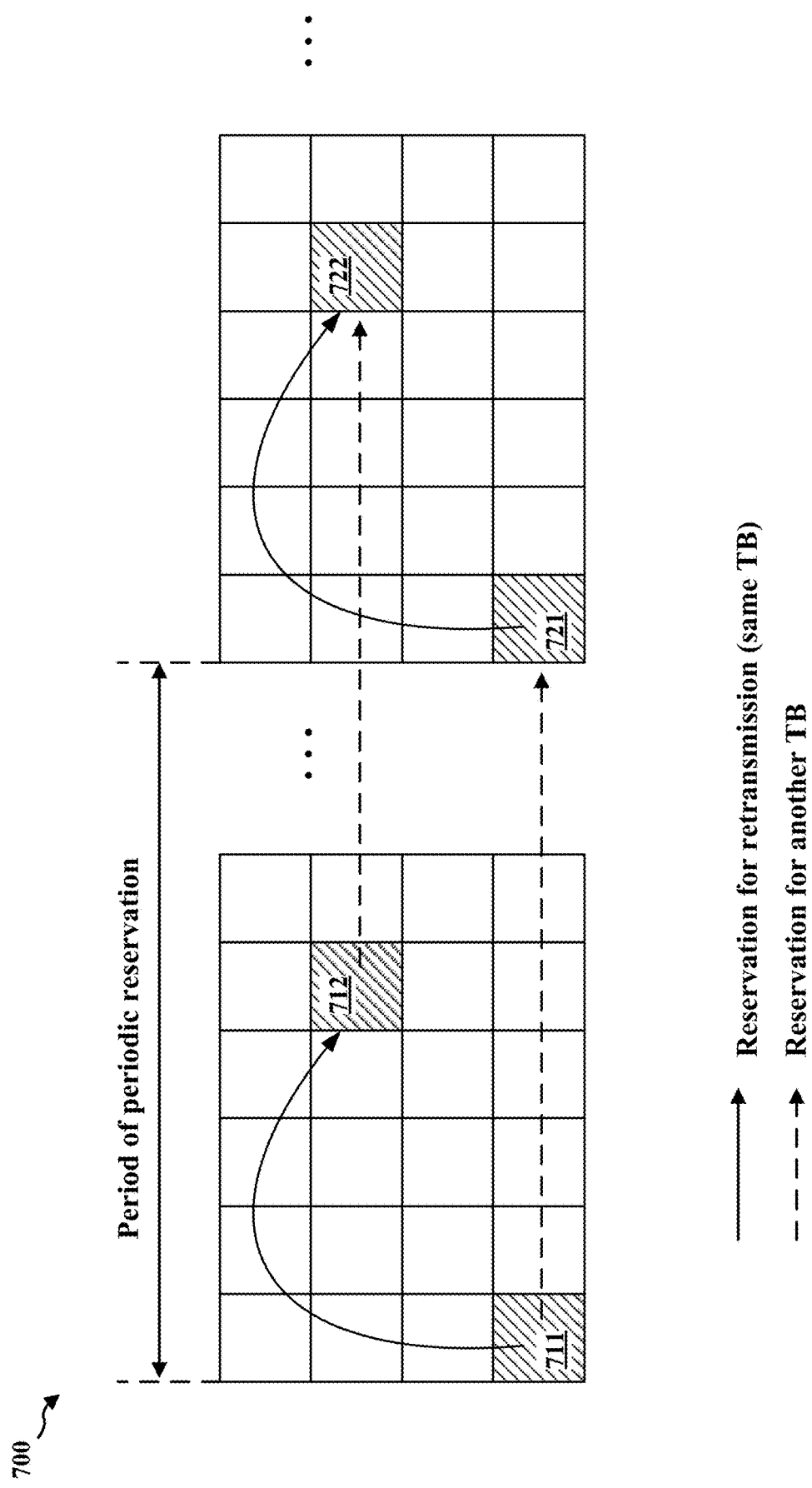
FIG. 7 is an example of sidelink resources showing periodic reservation for sidelink transmissions.

FIG. 7 is an example 700 of sidelink resources showing periodic reservation for sidelink transmissions. The example 700 of periodic sidelink resource reservation illustrates that a transmitting UE may reserve a single future resource block for retransmission in each transmission. That is, in the first transmission 711 of the first reservation period, the transmitting UE may indicates a reservation period and reserve one future resource 712 in the same period for retransmission of the same TB. If the transmitting UE receives the NACK after the first transmission 711, the transmitting UE may retransmit the TB in the reserved future resource 712 in the same period.

The example 700 of FIG. 7 illustrates that the transmitting UE may reserve two resources, e.g., 721 and 722, in the next period by the periodic reservation. Based on the period of retransmission indicated by the transmitting UE, the transmitting UE may reserve the sidelink resource 721 for transmitting another data packet in the next period, and the reserved sidelink resource 721 may indicate the reservation of the future resource 722 reserved for retransmission to make sure the periodic reservation and retransmission reservation are aligned.

The example 700 of FIG. 7 illustrates that the transmitting UE may reserve one future resource 712 in the same period for retransmission of the same TB or one future resource 722 in the future period for retransmission. However, this is an example, and the transmitting UE may reserve more than one future resources in the same period for retransmission of the same TB. For example, the transmitting UE may reserve another future resource within the period for another retransmission. That is, the reservation for retransmission may be chained.

In some aspects, the sidelink resource reservation may lead to 'persistent collision.' In the second resource allocation mode, e.g., Mode 2, each UE may autonomously determine the sidelink resources for transmission, any two different UEs may simultaneously select the same or overlapping resources for transmission because there is no centralized resource allocation, and the sidelink resource reservation by the two different UEs may end up reserving the same resource resulting in a collision. In cases of the periodic reservation or the SPS reservation, the resources reserved by the periodic or SPS reservation may have the same frequency location, e.g., a repeated 'pattern' as the resource(s) used in the current period, and the collision may persist over the periodic reservation or the SPS reservation. Particularly, if two transmitting UEs have the same traffic period and happened to select the same or overlapping resource for transmission in the current period, their transmissions in the next period may be in the same or overlapping resource as well, and this may lead to the 'persistent collision' of periodic or SPS sidelink transmissions.

Figure 8:
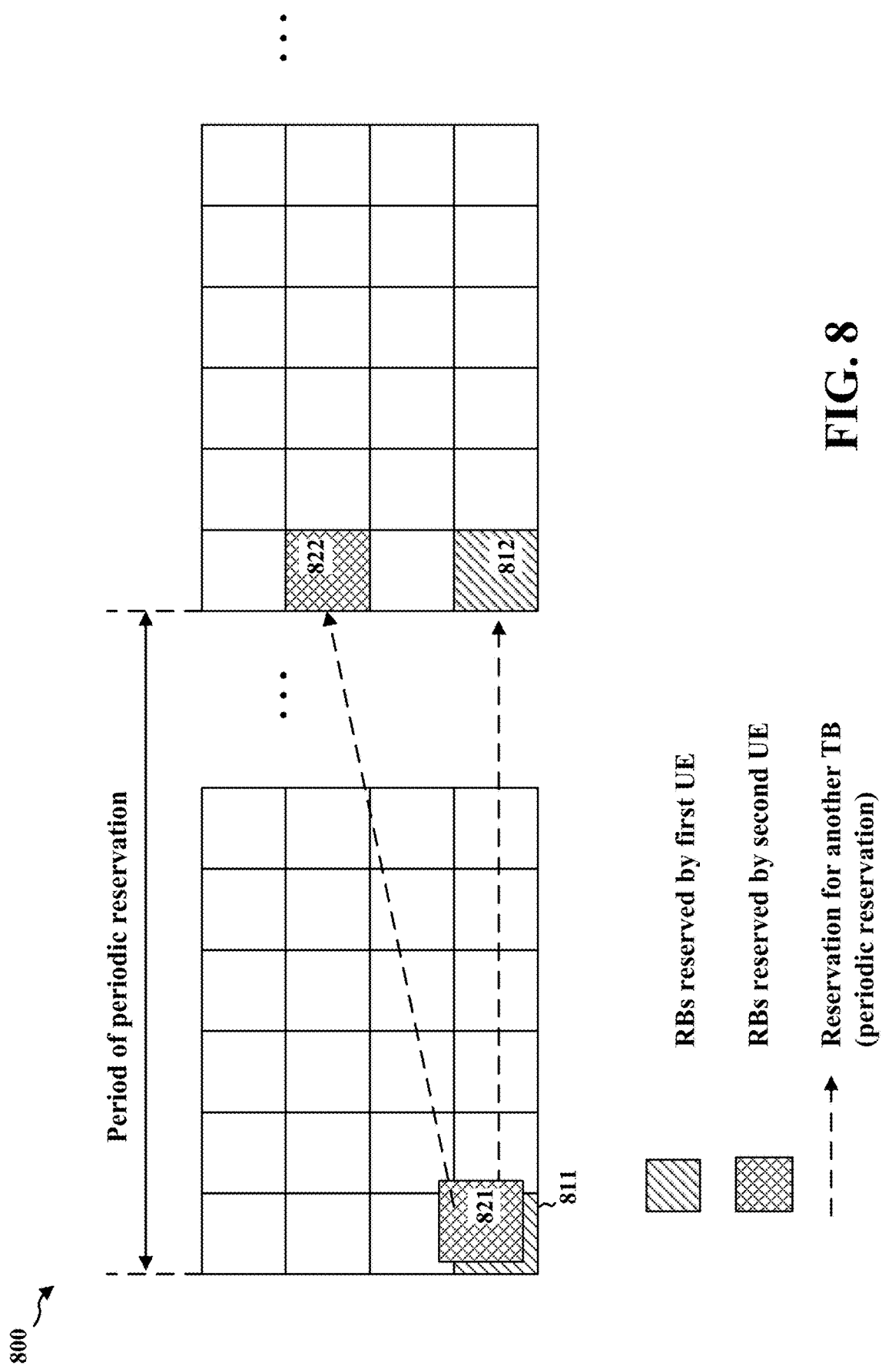
FIG. 8 is an example of sidelink resources showing periodic reservation for sidelink transmissions.

FIG. 8 is an example 800 of sidelink resources showing periodic reservation for sidelink transmissions. The example 800 shows that there is a collision in the resource reservation between a first UE and a second UE. That is, in the first period of the periodic reservation, the first UE may reserve the first sidelink resource 811 and the second UE may reserve the second sidelink resource 821, where the sidelink resource 811 and the second sidelink resource 821 are the same sidelink resource, causing the 'collision' in the sidelink resource reservation.

In some aspects, at least one UE may be configured with resource hopping to avoid or reduce a possible 'persistent collision' in periodic or SPS reservation of the sidelink resources. That is, the at least one UE may be configured to schedule a plurality of periodic sidelink resources, which may have a first periodicity, for sidelink communication, where the plurality of periodic sidelink resources may be shifted at a first frequency offset. Here, the example 800 of the FIG. 8 illustrates that the first UE may reserve the third sidelink resource 812 in the subsequent period of periodic reservation, and the second UE may reserve the fourth sidelink resource 822 at a frequency offset of two subchannels. Therefore, the third sidelink resource 812 reserved by the first UE may not overlap with the fourth sidelink resource 822 reserved by the second UE.

The resource hopping may be indicated by the transmitting UE or may be performed based on a configured rule. The resource hopping rule may be configured that, when two transmitting UEs are transmitting in the same slot with same resource reservation (transmission) period, the frequency location of their transmission may vary or be changed or from period to period, so they may not experience the persistent collision. That is, due to the resource hopping, the periodic transmissions from two UEs colliding in some period may not experience persistently collision.

In one aspect, the transmitting UE may indicate, in the SCI, the shifted resource for the subsequent period of periodic reservation. In another aspect, the transmitting UE may indicate, in the SCI, at least one parameter for determining the shifted resource for the subsequent period of periodic reservation. In another aspect, the transmitting UE may follow a configured rule to determine frequency offset for the subsequent periodic sidelink resources.

The transmitting UE may periodically perform the resource hopping. That is, the transmitting UE may periodically shift the sidelink resources reserved for the periodic or SPS reservation. In one aspect, the periodicity of the resource hopping may be configured the same as the periodicity of the periodic or SPS resource reservation. In another aspect, the periodicity of the resource hopping may be configured differently from the periodicity of the periodic or SPS resource reservation. For example, the periodicity of the resource hopping may be a multiple of the periodicity of the periodic or SPS resource reservation.

The resource pool may include, in a slot, K subchannels with subchannel index 0, 1, 2, ..., K−1. In one aspect, the transmitting UE's transmission in the current period may start from a subchannel k (0≤k≤K−1) and may have an allocation size of n subchannels (0<n≤K). That is, the transmitting UE may reserve the subchannels k, k+1, k+n−1 in the current slot for sidelink communication.

In some aspects, the resource hopping may be based on at least one parameter, and the at least one parameter for determining the shifted resource for the subsequent period of periodic reservation may be indicated in the SCI by the transmitting UE. For example, the parameter for determining the shifted resource of the resource hopping may include at least one of a physical layer source ID of the transmitting UE, a physical layer source ID of the receiving UE, a total number of the subchannels in the resource pool for the plurality of periodic sidelink resources, and a size of subchannels allocated for each of the plurality of periodic sidelink resources.

In one aspect, the resource hopping may be performed based on a UE Layer-1 source ID, e.g., the physical layer source ID, of the transmitting UE. That is, the transmitting UE may determine the resource hopping for the periodic or SPS resource reservation based on the physical layer source ID of the transmitting UE. The frequency offset of the resource hopping may be based on at least one of the physical layer source ID of the transmitting UE or a total number of subchannels in the resource pool for the plurality of periodic sidelink resources. The transmitting UE may indicate the physical layer source ID of the transmitting UE in the SCI. The SCI including the physical layer source ID of the transmitting UE and the size of the subchannels allocated for each of the plurality of periodic sidelink resources may be transmitted (or broadcasted) to the receiving UE and other UEs. In response to the resource hopping performed by the transmitting UE, the receiving UE may expect and/or decode the sidelink transmission, from the transmitting UE, in next period in the subchannels based on the physical layer source ID of the transmitting UE and the size of the subchannels allocated for each of the plurality of periodic sidelink resources indicated in the SCI. Also, another UE performing the resource selection, e.g., excluding sidelink resources that have been reserved by other UEs, may determine the sidelink resources occupied in next period by the transmitting UE's transmission based on the physical layer source ID of the transmitting UE and the size of the subchannels allocated for each of the plurality of periodic sidelink resources indicated in the SCI.

In one example, the transmitting UE may shift the sidelink resources in the next period by the frequency offset of $\mathrm{mod}(UE_{ID}, K)$, where the mod( ) is a modulo operation, the $UE_{ID}$ may represent the physical layer source ID of the transmitting UE, and K may represent the total number of subchannels in the resource pool for the plurality of periodic sidelink resources. That is, the transmitting UE's transmission in the next period may start from subchannel $k+\mathrm{mod}(UE_{ID}, K)$. The transmitting UE may reserve the sidelink resources in the next period in the subchannels from $k+\mathrm{mod}(UE_{ID}, K)$ to $k+\mathrm{mod}(UE_{ID}, K)+n-1$, where n may represent the size of the subchannels allocated for each of the plurality of periodic sidelink resources. In response to the resource hopping performed by the transmitting UE, the receiving UE may expect and/or decode the sidelink transmission, from the transmitting UE, in next period in the subchannels from $k+\mathrm{mod}(UE_{ID}, K)$ to $k+\mathrm{mod}(UE_{ID}, K)+n-1$. Also, another UE performing the resource selection, e.g., excluding sidelink resources that have been reserved by other UEs, may determine that the sidelink resources from subchannel $k+\mathrm{mod}(UE_{ID}, K)$ to $k+\mathrm{mod}(UE_{ID}, K)+n-1$ may be occupied in next period by the transmitting UE's transmission.

The sidelink transmission may be allocated consecutively in the frequency domain, and the frequency resource location shifted based on the physical layer source ID of the transmitting UE may result in a wrap-around from the last subchannel to the first subchannel in the resource pool for the plurality of periodic sidelink resources. For example, the transmitting UE's transmission may occupy two (2) subchannels from K−2 subchannel and the frequency offset of $\mathrm{mod}(UE_{ID}, K)$ may be 1, and the transmitting UE may determine that the frequency location for next period transmission starts from the subchannel K−1, i.e., the last subchannel in the slot, and end on the subchannel 0, i.e., the first subchannel in the slot, wrapping around the K subchannels of the resource pool for the plurality of periodic sidelink resources.

The transmitting UE may determine to avoid or reduce reserving the sidelink resources wrapping around the K subchannels of the resource pool for the plurality of periodic sidelink resources. Accordingly, the hopping rule may be slightly modified to avoid or reduce reserving the sidelink resources wrapping around the K subchannels of the resource pool for the plurality of periodic sidelink resources.

In another aspect, the resource hopping may be performed based on a UE Layer-1 source ID, e.g., the physical layer source ID, of the transmitting UE and the allocation size of the reserved sidelink resources. That is, the transmitting UE may determine the resource hopping for the periodic or SPS resource reservation based on the physical layer source ID of the transmitting UE and the size of the subchannels allocated for each of the plurality of periodic sidelink resources. The frequency offset of the resource hopping may be based on at least one of the physical layer source ID of the transmitting UE, a total number of subchannels in the resource pool for the plurality of periodic sidelink resources, or the size of the subchannels allocated for each of the plurality of periodic sidelink resources. The transmitting UE may indicate the physical layer source ID of the transmitting UE in the SCI. The SCI including the physical layer source ID of the transmitting UE and the size of the subchannels allocated for each of the plurality of periodic sidelink resources may be transmitted (or broadcasted) to the receiving UE and other UEs. In response to the resource hopping performed by the transmitting UE, the receiving UE may expect and/or decode the sidelink transmission, from the transmitting UE, in next period in the subchannels based on the physical layer source ID of the transmitting UE and the size of the subchannels allocated for each of the plurality of periodic sidelink resources indicated in the SCI. Also, another UE performing the resource selection, e.g., excluding sidelink resources that have been reserved by other UEs, may determine the sidelink resources occupied in next period by the transmitting UE's transmission based on the physical layer source ID of the transmitting UE and the size of the subchannels allocated for each of the plurality of periodic sidelink resources indicated in the SCI.

In one example, the transmitting UE may shift the sidelink resources in the next period by the frequency offset of $\mathrm{mod}(UE_{ID}, K-n+1)$, where $UE_{ID}$ may represent the first physical layer source ID of the transmitting UE, K may represent the total number of the subchannels in the resource pool for the plurality of periodic sidelink resources, and n may represent the size of the subchannels allocated for each of the plurality of periodic sidelink resources. That is, the transmitting UE's transmission in the next period may start from subchannel $k+\mathrm{mod}(UE_{ID}, K-n+1)$. The transmitting UE may reserve the sidelink resources in the next period in the subchannels from $k+\mathrm{mod}(UE_{ID}, K-n+1)$ to $k+\mathrm{mod}(UE_{ID}, K-n+1)+n-1$. In response to the resource hopping performed by the transmitting UE, the receiving UE may expect and/or decode the sidelink transmission, from the transmitting UE, in next period in the subchannels from $k+\mathrm{mod}(UE_{ID}, K-n+1)$ to $k+\mathrm{mod}(UE_{ID}, K-n+1)+n-1$. Also, another UE performing the resource selection, e.g., excluding sidelink resources that have been reserved by other UEs, may determine that the sidelink resources from subchannel $k+\mathrm{mod}(UE_{ID}, K-n+1)$ to $k+\mathrm{mod}(UE_{ID}, K-n+1)+n-1$ may be occupied in next period by the transmitting UE's transmission.

In another aspect, the resource hopping may be performed based on the UE Layer-1 source ID, e.g., the physical layer source ID, of the transmitting UE and the UE Layer-1 source ID, e.g., the physical layer source ID, of the receiving UE. That is, the transmitting UE may determine the resource hopping for the periodic or SPS resource reservation based on the physical layer source ID of the transmitting UE and the physical layer source ID of the receiving UE. The frequency offset of the resource hopping may be based on at least one of the physical layer source ID of the transmitting UE, the physical layer source ID of the receiving UE, or a total number of subchannels in the resource pool for the plurality of periodic sidelink resources. The transmitting UE may indicate the physical layer source ID of the transmitting UE and the physical layer source ID of the receiving UE in the SCI. The SCI including the physical layer source ID of the transmitting UE, the physical layer source ID of the receiving UE, and the size of the subchannels allocated for each of the plurality of periodic sidelink resources may be transmitted (or broadcasted) to the receiving UE and other UEs. In response to the resource hopping performed by the transmitting UE, the receiving UE may expect and/or decode the sidelink transmission, from the transmitting UE, in next period in the subchannels based on the physical layer source ID of the transmitting UE, the physical layer source ID of the receiving UE, and the size of the subchannels allocated for each of the plurality of periodic sidelink resources indicated in the SCI. Also, another UE performing the resource selection, e.g., excluding sidelink resources that have been reserved by other UEs, may determine the sidelink resources occupied in next period by the transmitting UE's transmission based on the physical layer source ID of the transmitting UE, the physical layer source ID of the receiving UE, and the size of the subchannels allocated for each of the plurality of periodic sidelink resources indicated in the SCI.

In one example, the transmitting UE may shift the sidelink resources in the next period by the frequency offset of $mod(UE_{ID}+UE_{ID\_D}, K)$, where mod( ) is a modulo operation, the $UE_{ID}$ may represent the physical layer source ID of the transmitting UE, $UE_{ID\_D}$ may represent the physical layer source ID of the receiving UE, and K may represent the total number of subchannels in the resource pool for the plurality of periodic sidelink resources. That is, the transmitting UE's transmission in the next period may start from subchannel $k+mod(UE_{ID}+UE_{ID\_D}, K)$. The transmitting UE may reserve the sidelink resources in the next period in the subchannels from $k+mod(UE_{ID}+UE_{ID\_D}, K)$ to $k+mod(UE_{ID}+UE_{ID\_D}, K)+n-1$. In response to the resource hopping performed by the transmitting UE, the receiving UE may expect and/or decode the sidelink transmission, from the transmitting UE, in next period in the subchannels from $k+mod(UE_{ID}+UE_{ID\_D}, K)$ to $k+mod(UE_{ID}+UE_{ID\_D}, K)+n-1$. Also, another UE performing the resource selection, e.g., excluding sidelink resources that have been reserved by other UEs, may determine that the sidelink resources from subchannel $k+mod(UE_{ID}+UE_{ID\_D}, K)$ to $k+mod(UE_{ID}+UE_{ID\_D}, K)+n-1$ may be occupied in next period by the transmitting UE's transmission.

The sidelink transmission may be allocated consecutively in frequency domain, and the frequency resource location shifted based on the physical layer source ID of the transmitting UE and the physical layer source ID of the receiving UE may result in a wrap-around from the last subchannel to the first subchannel in the resource pool for the plurality of periodic sidelink resources. For example, the transmitting UE's transmission may occupy two (2) subchannels from K−2 subchannel and the frequency offset of $mod(UE_{ID}+UE_{ID\_D}, K)$ may be 1, and the transmitting UE may determine that the frequency location for next period transmission starts from the subchannel K−1, i.e., the last subchannel in the slot, and end on the subchannel 0, i.e., the first subchannel in the slot, wrapping around the K subchannels of the resource pool for the plurality of periodic sidelink resources.

The transmitting UE may determine to avoid reserving the sidelink resources wrapping around the K subchannels of the resource pool for the plurality of periodic sidelink resources. Accordingly, the hopping rule may be slightly modified to avoid reserving the sidelink resources wrapping around the K subchannels of the resource pool for the plurality of periodic sidelink resources.

In another aspect, the resource hopping may be performed based on a UE Layer-1 source ID, e.g., the physical layer source ID, of the transmitting UE, the UE Layer-1 source ID, e.g., the physical layer source ID, of the receiving UE, and the allocation size of the reserved sidelink resources. That is, the transmitting UE may determine the resource hopping for the periodic or SPS resource reservation based on the physical layer source ID of the transmitting UE, the physical layer source ID of the receiving UE, and the size of the subchannels allocated for each of the plurality of periodic sidelink resources. The frequency offset of the resource hopping may be based on at least one of the physical layer source ID of the transmitting UE, the physical layer source ID of the receiving UE, a total number of subchannels in the resource pool for the plurality of periodic sidelink resources, or the size of the subchannels allocated for each of the plurality of periodic sidelink resources. The transmitting UE may indicate the physical layer source ID of the transmitting UE, the physical layer source ID of the receiving UE, and the size of the subchannels allocated for each of the plurality of periodic sidelink resources in the SCI. The SCI including the physical layer source ID of the transmitting UE, the physical layer source ID of the receiving UE, and the size of the subchannels allocated for each of the plurality of periodic sidelink resources may be transmitted (or broadcasted) to the receiving UE and other UEs. In response to the resource hopping performed by the transmitting UE, the receiving UE may expect and/or decode the sidelink transmission, from the transmitting UE, in next period in the subchannels based on the physical layer source ID of the transmitting UE, the physical layer source ID of the receiving UE, and the size of the subchannels allocated for each of the plurality of periodic sidelink resources indicated in the SCI. Also, another UE performing the resource selection, e.g., excluding sidelink resources that have been reserved by other UEs, may determine the sidelink resources occupied in next period by the transmitting UE's transmission based on the physical layer source ID of the transmitting UE, the physical layer source ID of the receiving UE, and the size of the subchannels allocated for each of the plurality of periodic sidelink resources indicated in the SCI.

In one example, the transmitting UE may shift the sidelink resources in the next period by the frequency offset of $mod(UE_{ID}+UE_{ID\_D}, K-n+1)$, where $UE_{ID}$ may represent the first physical layer source ID of the transmitting UE, $UE_{ID\_D}$ may represent the physical layer source ID of the receiving UE, K may represent the total number of the subchannels in the resource pool for the plurality of periodic sidelink resources, and n may represent the size of the subchannels allocated for each of the plurality of periodic sidelink resources. That is, the transmitting UE's transmission in the next period may start from subchannel $k+mod(UE_{ID}+UE_{ID\_D}, K-n+1)$. The transmitting UE may reserve the sidelink resources in the next period in the subchannels from $k+mod(UE_{ID}+UE_{ID\_D}, K-n+1)$ to $k+mod(UE_{ID}+UE_{ID\_D}, K-n+1)+n-1$. In response to the resource hopping performed by the transmitting UE, the receiving UE may expect and/or decode the sidelink transmission, from the transmitting UE, in next period in the subchannels from $k+mod(UE_{ID}+UE_{ID\_D}, K-n+1)$ to $k+mod(UE_{ID}+UE_{ID\_D}, K-n+1)+n-1$. Also, another UE performing the resource selection, e.g., excluding sidelink resources that have been reserved by other UEs, may determine that the sidelink resources from subchannel k+mod($UE_{ID}+UE_{ID\_D}$, K−n+1) to k+mod ($UE_{ID}+UE_{ID\_D}$, K−n+1)+n−1 may be occupied in next period by the transmitting UE's transmission.

In some aspects, the transmitting UE may indicate a subchannel offset to be applied to its future resource allocations. The transmitting UE may determine an offset value that is valid for its next period resource reservation. That is, the transmitting UE may determine the frequency offset of the resource hopping and indicate the frequency offset in the SCI. The transmitting UE may indicate the determined offset value in its SCI transmission. That is, the SCI including the frequency offset may be transmitted (or broadcasted) to the receiving UE and other UEs. In response to the resource hopping performed by the transmitting UE, the receiving UE may expect and/or decode the sidelink transmission, from the transmitting UE, in next period in the subchannels based on the frequency offset indicated in the SCI. Also, another UE performing the resource selection, e.g., excluding sidelink resources that have been reserved by other UEs, may determine the sidelink resources occupied in next period by the transmitting UE's transmission based on the frequency offset indicated in the SCI.

For example, the transmitting UE's current transmission may start from the subchannel k, and its next transmission in the next period may start from the subchannel k+m, where m is the offset value indicated in the SCI by the transmitting UE.

In one aspect, the resource pool may include, in a slot, K subchannels with subchannel index 0, 1, 2, . . . , K−1, and the offset value may be determined randomly from the K subchannels. In another aspect, the offset value may be determined randomly from a subset of offset values, e.g., from 0 to K-n, n may represent the size of the subchannels allocated for each of the plurality of periodic sidelink resources.

The transmitting UE configured with the resource hopping may avoid or reduce a persistent collision with other UEs that may not be configured with the resource hopping. That is, by providing at least one transmitting UE with the resource hopping for reserving the resources of the sidelink communication, the transmitting UE may reduce the persistent collision with the other UEs that may not be configured with the resource hopping.

In one aspect, the resource hopping of the periodic or SPS resource reservation may be configured for UEs that may support the resource hopping. That is, the transmitting UE may be configured with a new SCI-2 format or be assigned with reserved bits in the SCI-1, and the transmitting UE may use the new SCI-2 or the SCI-1 to enable the periodic reservation. The new periodic reservation may be transparent to the UEs that may not be configured with the resource hopping or may not support the resource hopping. The UEs that do not support the resource hopping may not recognize the new periodic reservation by the transmitting UE, and the UEs that do not support the resource hopping may treat the new resource hopping by the transmitting UE as non-periodic transmissions. Accordingly, the UEs that do not support the resource hopping may not be affected by the periodic transmissions including the resource hopping, while the resource hopping may be enabled for the other UEs that may support the resource hopping In another aspect, the resource hopping of the periodic or SPS resource reservation may be configured as a feature for newly designed sidelink air interface. For example, the new sidelink air interface may be redesigned for other applications, e.g., for applications other than V2X, and the resource hopping of the periodic or SPS resource reservation may be introduced as a baseline feature for the new sidelink air interface redesigned for other applications.

The resource hopping of the periodic or SPS resource reservation may be enabled or disabled by configuration or specification. In another aspect, the transmitting UE may indicate the other UEs to enable or disable the resource hopping of the periodic or SPS resource reservation.

Figure 9:
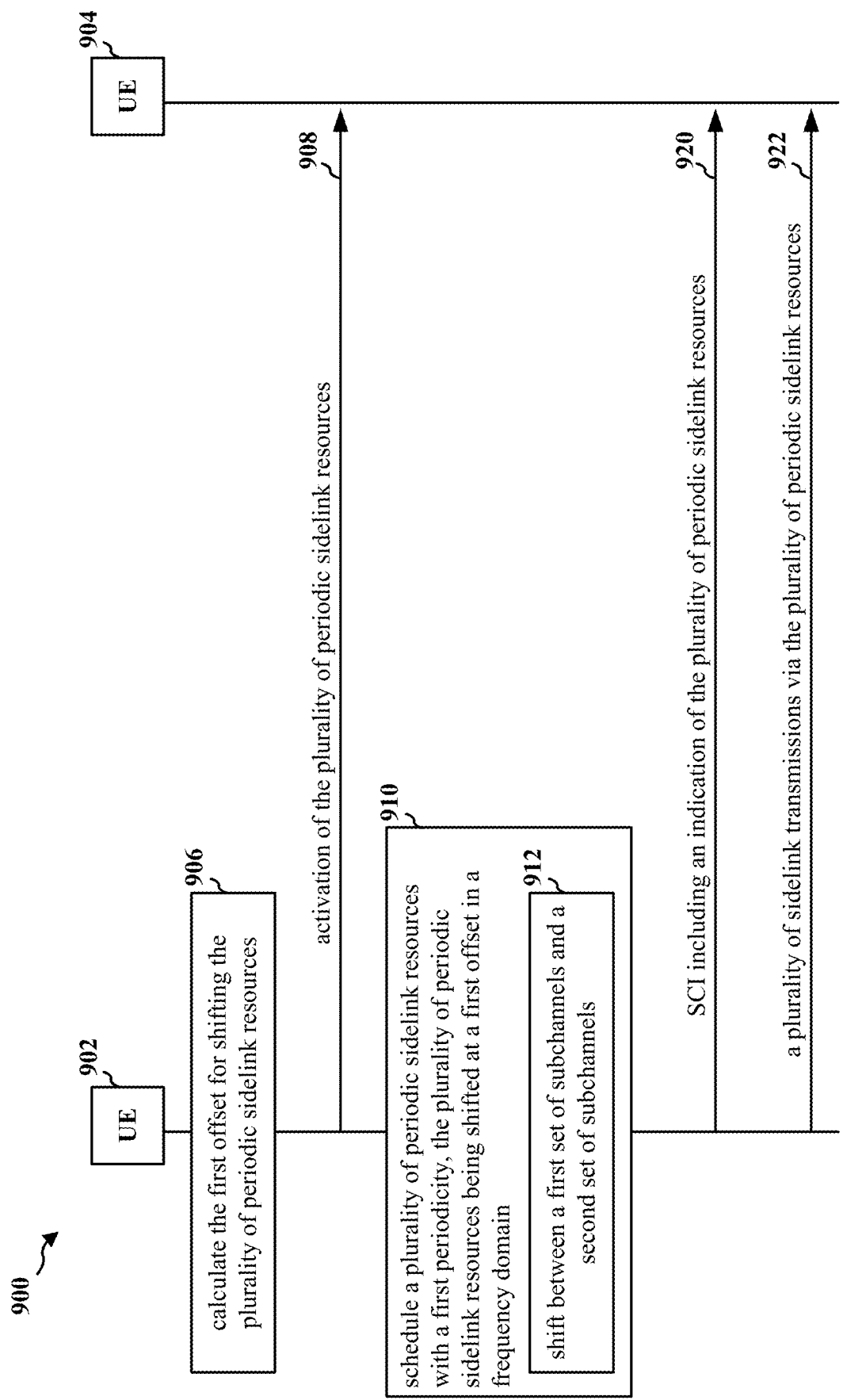
FIG. 9 is a call-flow diagram of a method of wireless communication.

FIG. 9 is a call-flow diagram 900 of a method of wireless communication. The call-flow diagram 900 may include a first UE 902 and a second UE 904. The first UE 902 may be a transmitting UE and the second UE 904 may be a receiving UE. The first UE 902 may perform resource hopping for the periodic sidelink resource reservation by scheduling a plurality of periodic sidelink resources with a first periodicity, the plurality of periodic sidelink resources being shifted at a first offset in a frequency domain. The first UE 902 may avoid or reduce persistent collision of periodic or SPS reservation of the sidelink resources with another UE. The first UE 902 may transmit, to the second UE 904, the SCI indicating the first offset, and transmit, to the second UE 904, the plurality of sidelink transmissions via the plurality of periodic sidelink resources at the first periodicity based on the SCI. The second UE 904 may receive, from the first UE 902, the SCI and receive, from the first UE 902, the plurality of sidelink transmissions via the plurality of periodic sidelink resources at the first periodicity based on the SCI.

At 906, the first UE 902 may calculate the first offset for shifting the plurality of periodic sidelink resources, where the SCI includes the first offset. In one aspect, the first offset may be based on at least one of a first physical layer source ID of the first UE 902 or a total number of subchannels in a resource pool for the plurality of periodic sidelink resources. For example, the first offset may be calculated as mod($UE_{ID}$, K), where $UE_{ID}$ may represent the first physical layer source ID of the first UE 902 and K may represent the total number of subchannels in the resource pool for the plurality of periodic sidelink resources. In another aspect, the first offset may further be based on a size of the subchannels allocated for each of the plurality of periodic sidelink resources. For example, the first offset may be calculated as mod($UE_{ID}$, K−n+1), where n may represent the size of the subchannels allocated for each of the plurality of periodic sidelink resources. In another aspect, the first offset may be further based on a second physical layer source ID of the second UE 904. For example, the first offset may be calculated as mod($UE_{ID}+UE_{ID\_D}$, K) or mod($UE_{ID}+UE_{ID\_D}$, K−n+1), where $UE_{ID\_D}$ may represent the second physical layer source ID of the second UE 904.

At 908, the first UE 902 may transmit, to the second UE 904, an activation of the plurality of periodic sidelink resources, and the second UE 904 may receive, from the first UE 902, an activation of the plurality of periodic sidelink resources. The activation may indicate that the plurality of periodic sidelink resources is shifted at the first offset in the frequency domain. Here, the activation may be transmitted via at least one of a dedicated SCI-2 or a reserved bit in a SCI-1.

At 910, the first UE 902 may schedule a plurality of periodic sidelink resources with a first periodicity for communicating with a second UE 904 at the first periodicity, the plurality of periodic sidelink resources being shifted at a first offset in a frequency domain. Here, the plurality of periodic sidelink resources may be periodically shifted at a second periodicity. In one example, the second periodicity may be a multiple of the first periodicity. The first offset may be based on at least one of the first physical layer source ID of the first UE 902, the second physical layer source ID of the second UE 904, or the total number of subchannels in a resource pool for the plurality of periodic sidelink resources, or the size of the subchannels allocated for each of the plurality of periodic sidelink resources. For example, the first offset may be calculated as one of mod($UE_{ID}$, K), mod($UE_{ID}$, K-n+1), mod($UE_{ID}+UE_{ID\_D}$, K), or mod($UE_{ID}+UE_{ID\_D}$, K-n+1). 910 may include 912. At 912, the first UE 902 may shift between a first set of subchannels and a second set of subchannels in the frequency domain, where the second set of subchannels are offset from the first set of subchannels by the first offset.

At 920, the first UE 902 may transmit, to the second UE 904, SCI including an indication of the plurality of periodic sidelink resources at the first periodicity. The second UE 904 may receive, from a first UE 902, SCI including an indication of a plurality of periodic sidelink resources at a first periodicity, the plurality of periodic sidelink resources being shifted at a first offset in a frequency domain. The SCI may include at least one of the first physical layer source ID of the first UE 902, the second physical layer source ID of the second UE 904, or the total number of subchannels in a resource pool for the plurality of periodic sidelink resources, or the size of the subchannels allocated for each of the plurality of periodic sidelink resources.

At 922, the first UE 902 may transmit, to the second UE 904, a plurality of sidelink transmissions via the plurality of periodic sidelink resources at the first periodicity. The second UE 904 may receive from the first UE 902, a plurality of sidelink transmissions via the plurality of periodic sidelink resources at the first periodicity. The first UE 902 may reduce the persistent collision with the other UEs.

Figure 10:
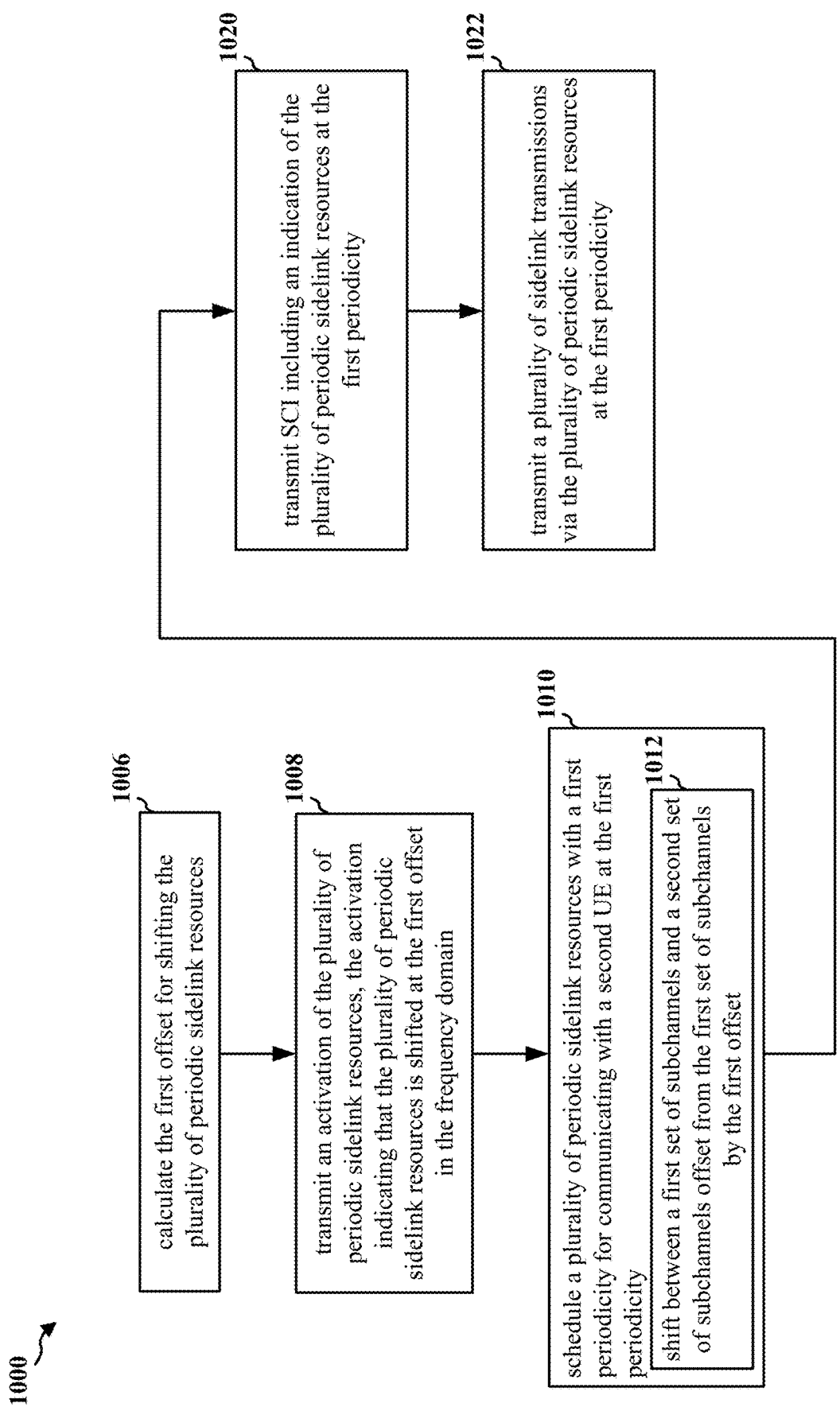
FIG. 10 is a flowchart of a method of wireless communication.

FIG. 10 is a flowchart 1000 of a method of wireless communication. The method may be performed by a transmitting UE (e.g., the UE 104/902; the apparatus 1402). The first UE may perform resource hopping for a periodic sidelink resource reservation by scheduling a plurality of periodic sidelink resources with a first periodicity, the plurality of periodic sidelink resources being shifted at a first offset in a frequency domain. The first UE may avoid or reduce persistent collision of periodic or SPS reservation of the sidelink resources with another UE. The first UE may transmit, to a second UE, the SCI indicating the first offset, and transmit, to the second UE, the plurality of sidelink transmissions via the plurality of periodic sidelink resources at the first periodicity based on the SCI.

At 1006, the first UE may calculate the first offset for shifting the plurality of periodic sidelink resources, where the SCI includes the first offset. In one aspect, the first offset may be based on at least one of a first physical layer source ID of the first UE or a total number of subchannels in a resource pool for the plurality of periodic sidelink resources. For example, the first offset may be calculated as mod($UE_{ID}$, K), where $UE_{ID}$ may represent the first physical layer source ID of the first UE and K may represent the total number of subchannels in the resource pool for the plurality of periodic sidelink resources. In another aspect, the first offset may further be based on a size of the subchannels allocated for each of the plurality of periodic sidelink resources. For example, the first offset may be calculated as mod($UE_{ID}$, K-n+1), where n may represent the size of the subchannels allocated for each of the plurality of periodic sidelink resources. In another aspect, the first offset may be further based on a second physical layer source ID of the second UE. For example, the first offset may be calculated as mod($UE_{ID}+UE_{ID\_D}$, K) or mod($UE_{ID}+UE_{ID\_D}$, K-n+1), where $UE_{ID\_D}$ may represent the second physical layer source ID of the second UE. For example, at 906, the first UE 902 may calculate the first offset for shifting the plurality of periodic sidelink resources, where the SCI includes the first offset. Furthermore, 1006 may be performed by a periodic sidelink resource configuration component 1440.

At 1008, the first UE may transmit, to the second UE, an activation of the plurality of periodic sidelink resources. The activation may indicate that the plurality of periodic sidelink resources is shifted at the first offset in the frequency domain. Here, the activation may be transmitted via at least one of a dedicated SCI-2 or a reserved bit in a SCI-1. For example, at 908, the first UE 902 may transmit, to the second UE 904, an activation of the plurality of periodic sidelink resources. Furthermore, 1008 may be performed by the periodic sidelink resource configuration component 1440.

At 1010, the first UE may schedule a plurality of periodic sidelink resources with a first periodicity for communicating with a second UE at the first periodicity, the plurality of periodic sidelink resources being shifted at a first offset in a frequency domain. Here, the plurality of periodic sidelink resources may be periodically shifted at a second periodicity. In one example, the second periodicity may be a multiple of the first periodicity. The first offset may be based on at least one of the first physical layer source ID of the first UE, the second physical layer source ID of the second UE, or the total number of subchannels in a resource pool for the plurality of periodic sidelink resources, or the size of the subchannels allocated for each of the plurality of periodic sidelink resources. For example, the first offset may be calculated as one of mod($UE_{ID}$, K), mod($UE_{ID}$, K-n+1), mod($UE_{ID}+UE_{ID\_D}$, K), or mod($UE_{ID}+UE_{ID\_D}$, K-n+1). 1010 may include 1012. At 1012, the first UE may shift between a first set of subchannels and a second set of subchannels in the frequency domain, where the second set of subchannels are offset from the first set of subchannels by the first offset. For example, at 910, the first UE 902 may schedule a plurality of periodic sidelink resources with a first periodicity for communicating with the second UE 904 at the first periodicity, the plurality of periodic sidelink resources being shifted at a first offset in a frequency domain. Furthermore, 1010 and 1012 may be performed by the periodic sidelink resource configuration component 1440.

At 1020, the first UE may transmit, to the second UE, SCI including an indication of the plurality of periodic sidelink resources at the first periodicity. The SCI may include at least one of the first physical layer source ID of the first UE, the second physical layer source ID of the second UE, or the total number of subchannels in a resource pool for the plurality of periodic sidelink resources, or the size of the subchannels allocated for each of the plurality of periodic sidelink resources. For example, at 920, the first UE 902 may transmit, to the second UE 904, SCI including an indication of the plurality of periodic sidelink resources at the first periodicity. Furthermore, 1020 may be performed by an SCI component 1442.

At 1022, the first UE may transmit, to the second UE, a plurality of sidelink transmissions via the plurality of periodic sidelink resources at the first periodicity. The first UE may reduce the persistent collision with the other UEs. For example, at 922, the first UE 902 may transmit, to the second UE 904, a plurality of sidelink transmissions via the plurality of periodic sidelink resources at the first periodicity. Furthermore, 1022 may be performed by a sidelink communication component 1444.

Figure 11:
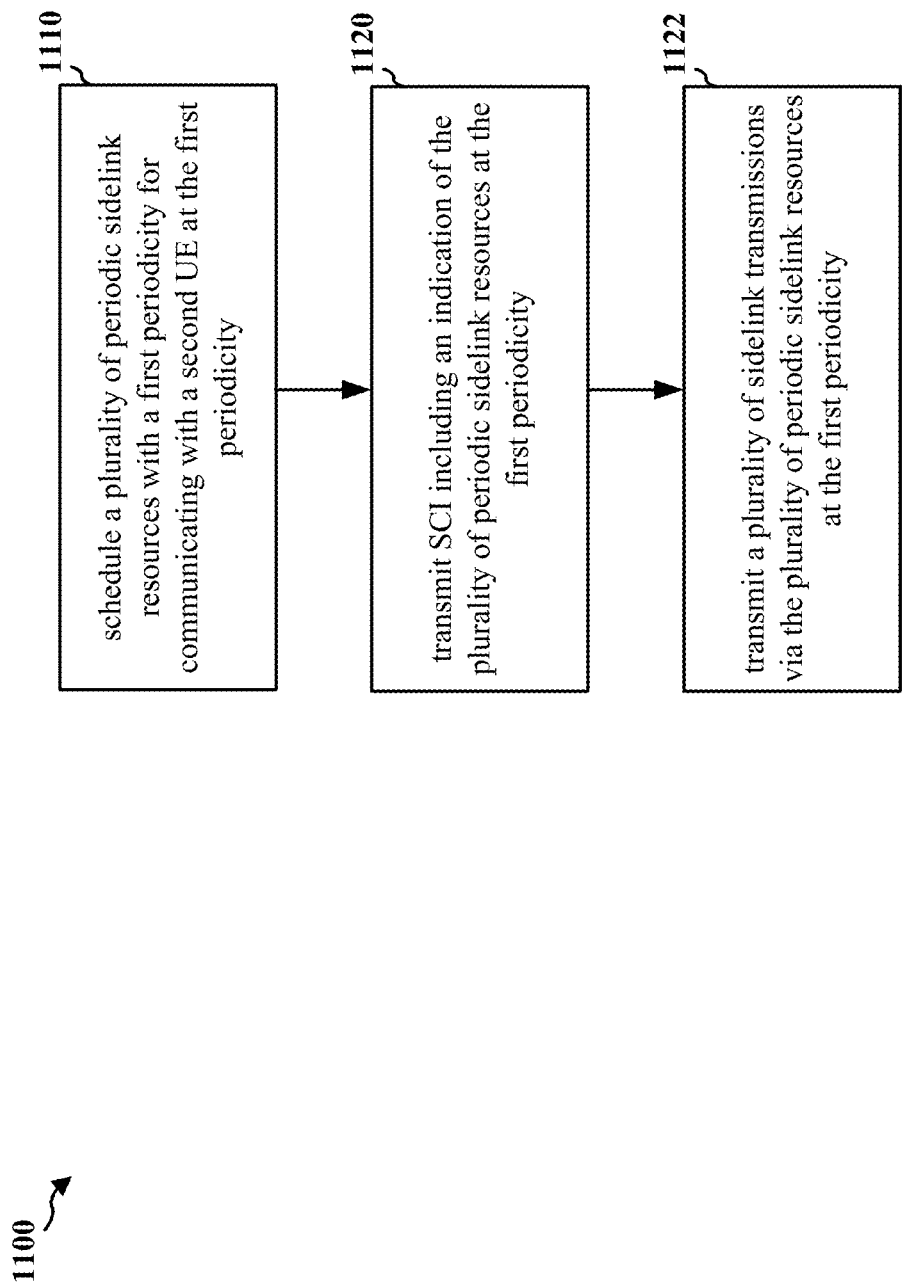
FIG. 11 is a flowchart of a method of wireless communication.

FIG. 11 is a flowchart 1100 of a method of wireless communication. The method may be performed by a transmitting UE (e.g., the UE 114/902; the apparatus 1402). The first UE may perform resource hopping for a periodic sidelink resource reservation by scheduling a plurality of periodic sidelink resources with a first periodicity, the plurality of periodic sidelink resources being shifted at a first offset in a frequency domain. The first UE may avoid or reduce persistent collision of periodic or SPS reservation of the sidelink resources with another UE. The first UE may transmit, to a second UE, the SCI indicating the first offset, and transmit, to the second UE, the plurality of sidelink transmissions via the plurality of periodic sidelink resources at the first periodicity based on the SCI.

At 1110, the first UE may schedule a plurality of periodic sidelink resources with a first periodicity for communicating with a second UE at the first periodicity, the plurality of periodic sidelink resources being shifted at a first offset in a frequency domain. Here, the plurality of periodic sidelink resources may be periodically shifted at a second periodicity. In one example, the second periodicity may be a multiple of the first periodicity. The first offset may be based on at least one of the first physical layer source ID of the first UE, the second physical layer source ID of the second UE, or the total number of subchannels in a resource pool for the plurality of periodic sidelink resources, or the size of the subchannels allocated for each of the plurality of periodic sidelink resources. For example, the first offset may be calculated as one of $mod(UE_{ID}, K)$, $mod(UE_{ID}, K-n+1)$, $mod(UE_{ID}+UE_{ID\_D}, K)$, or $mod(UE_{ID}+UE_{ID\_D}, K-n+1)$. For example, at 910, the first UE 902 may schedule a plurality of periodic sidelink resources with a first periodicity for communicating with the second UE 904 at the first periodicity, the plurality of periodic sidelink resources being shifted at a first offset in a frequency domain. Furthermore, 1110 may be performed by the periodic sidelink resource configuration component 1440.

At 1120, the first UE may transmit, to the second UE, SCI including an indication of the plurality of periodic sidelink resources at the first periodicity. The SCI may include at least one of the first physical layer source ID of the first UE, the second physical layer source ID of the second UE, or the total number of subchannels in a resource pool for the plurality of periodic sidelink resources, or the size of the subchannels allocated for each of the plurality of periodic sidelink resources. For example, at 920, the first UE 902 may transmit, to the second UE 904, SCI including an indication of the plurality of periodic sidelink resources at the first periodicity. Furthermore, 1120 may be performed by an SCI component 1442.

At 1122, the first UE may transmit, to the second UE, a plurality of sidelink transmissions via the plurality of periodic sidelink resources at the first periodicity. The first UE may reduce the persistent collision with the other UEs. For example, at 922, the first UE 902 may transmit, to the second UE 904, a plurality of sidelink transmissions via the plurality of periodic sidelink resources at the first periodicity. Furthermore, 1122 may be performed by a sidelink communication component 1444.

Figure 12:
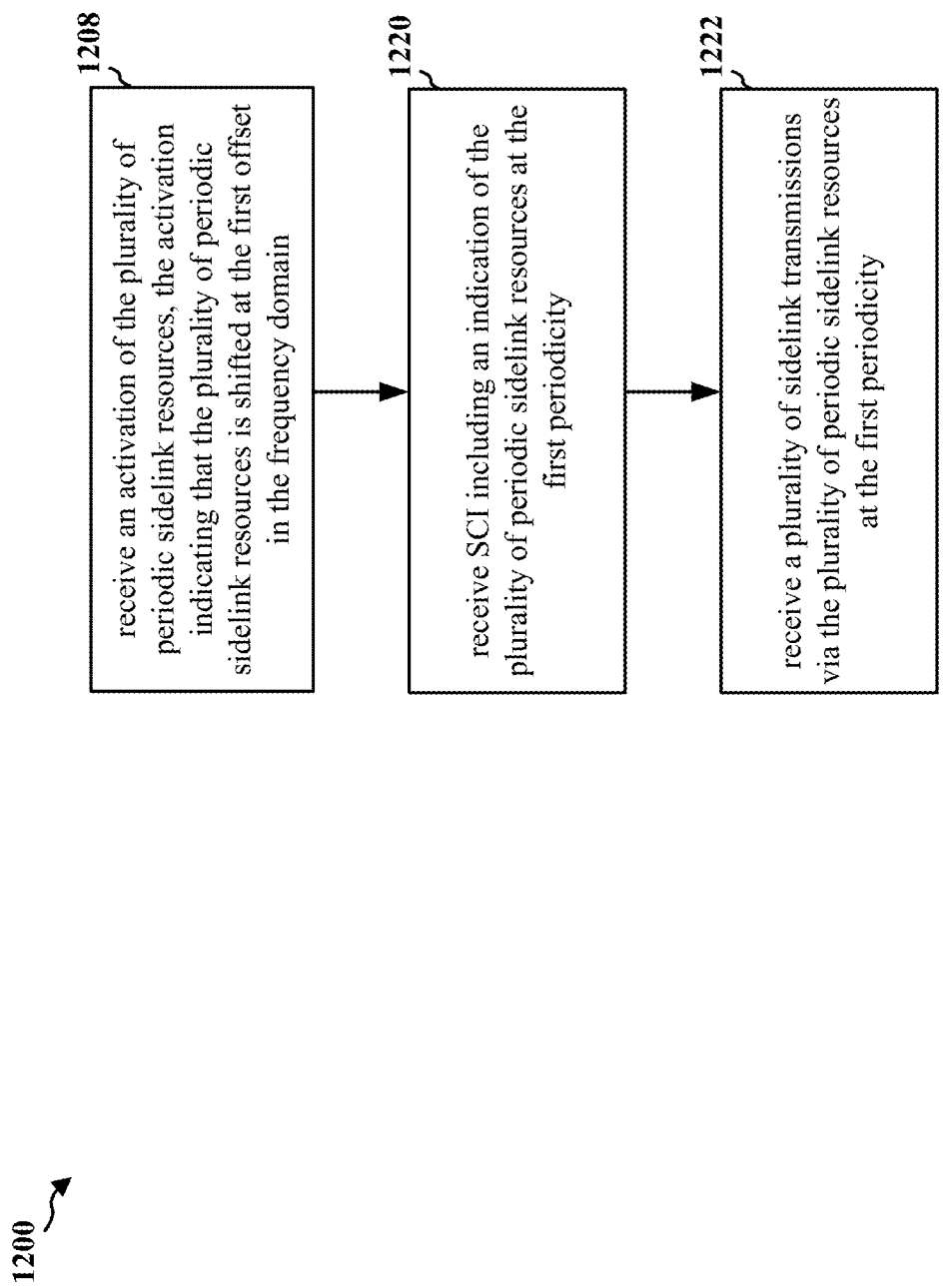
FIG. 12 is a flowchart of a method of wireless communication.

FIG. 12 is a flowchart 1200 of a method of wireless communication. The method may be performed by a receiving UE (e.g., the UE 104/904; the apparatus 1402). The second UE may receive, from a first UE, SCI and receive, from the first UE, a plurality of sidelink transmissions via a plurality of periodic sidelink resources at a first periodicity based on the SCI, where the plurality of periodic sidelink resources may be shifted at a first offset in a frequency domain, and the SCI may indicate the first offset.

At 1208, the second UE may receive, from the first UE, an activation of the plurality of periodic sidelink resources. The activation may indicate that the plurality of periodic sidelink resources is shifted at the first offset in the frequency domain. Here, the activation may be transmitted via at least one of a dedicated SCI-2 or a reserved bit in a SCI-1. For example, at 908, the second UE 904 may receive, from the first UE 902, an activation of the plurality of periodic sidelink resources. Furthermore, 1208 may be performed by a periodic sidelink resource configuration component 1440.

At 1220, the second UE may receive, from a first UE, SCI including an indication of a plurality of periodic sidelink resources at a first periodicity, the plurality of periodic sidelink resources being shifted at a first offset in a frequency domain. The SCI may include at least one of the first physical layer source ID of the first UE, the second physical layer source ID of the second UE, or the total number of subchannels in a resource pool for the plurality of periodic sidelink resources, or the size of the subchannels allocated for each of the plurality of periodic sidelink resources. For example, at 920, the second UE 904 may receive, from the first UE 902, SCI including an indication of a plurality of periodic sidelink resources at a first periodicity, the plurality of periodic sidelink resources being shifted at a first offset in a frequency domain. Furthermore, 1220 may be performed by an SCI component 1442.

At 1222, the second UE may receive from the first UE, a plurality of sidelink transmissions via the plurality of periodic sidelink resources at the first periodicity. For example, at 922, the second UE 904 may receive from the first UE 902, a plurality of sidelink transmissions via the plurality of periodic sidelink resources at the first periodicity. Furthermore, 1222 may be performed by a sidelink communication component 1444.

Figure 13:
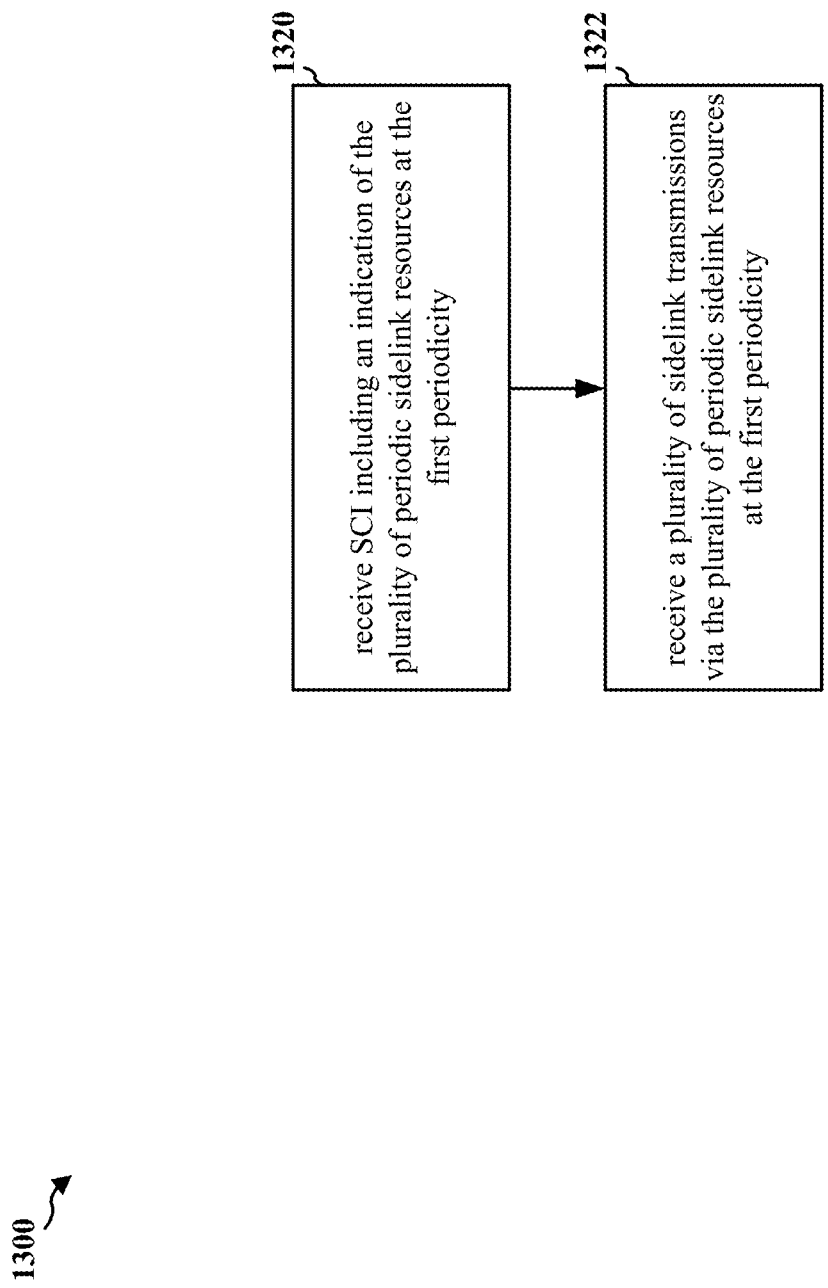
FIG. 13 is a flowchart of a method of wireless communication.

FIG. 13 is a flowchart 1300 of a method of wireless communication. The method may be performed by a receiving UE (e.g., the UE 104/904; the apparatus 1402). The second UE may receive, from a first UE, SCI and receive, from the first UE, a plurality of sidelink transmissions via a plurality of periodic sidelink resources at a first periodicity based on the SCI, where the plurality of periodic sidelink resources may be shifted at a first offset in a frequency domain, and the SCI may indicate the first offset.

At 1320, the second UE may receive, from a first UE, SCI including an indication of a plurality of periodic sidelink resources at a first periodicity, the plurality of periodic sidelink resources being shifted at a first offset in a frequency domain. The SCI may include at least one of the first physical layer source ID of the first UE, the second physical layer source ID of the second UE, or the total number of subchannels in a resource pool for the plurality of periodic sidelink resources, or the size of the subchannels allocated for each of the plurality of periodic sidelink resources. For example, at 920, the second UE 904 may receive, from the first UE 902, SCI including an indication of a plurality of periodic sidelink resources at a first periodicity, the plurality of periodic sidelink resources being shifted at a first offset in a frequency domain. Furthermore, 1320 may be performed by an SCI component 1442.

At 1322, the second UE may receive from the first UE, a plurality of sidelink transmissions via the plurality of periodic sidelink resources at the first periodicity. For example, at 922, the second UE 904 may receive from the first UE 902, a plurality of sidelink transmissions via the plurality of periodic sidelink resources at the first periodicity. Furthermore, 1322 may be performed by a sidelink communication component 1444.

Figure 14:
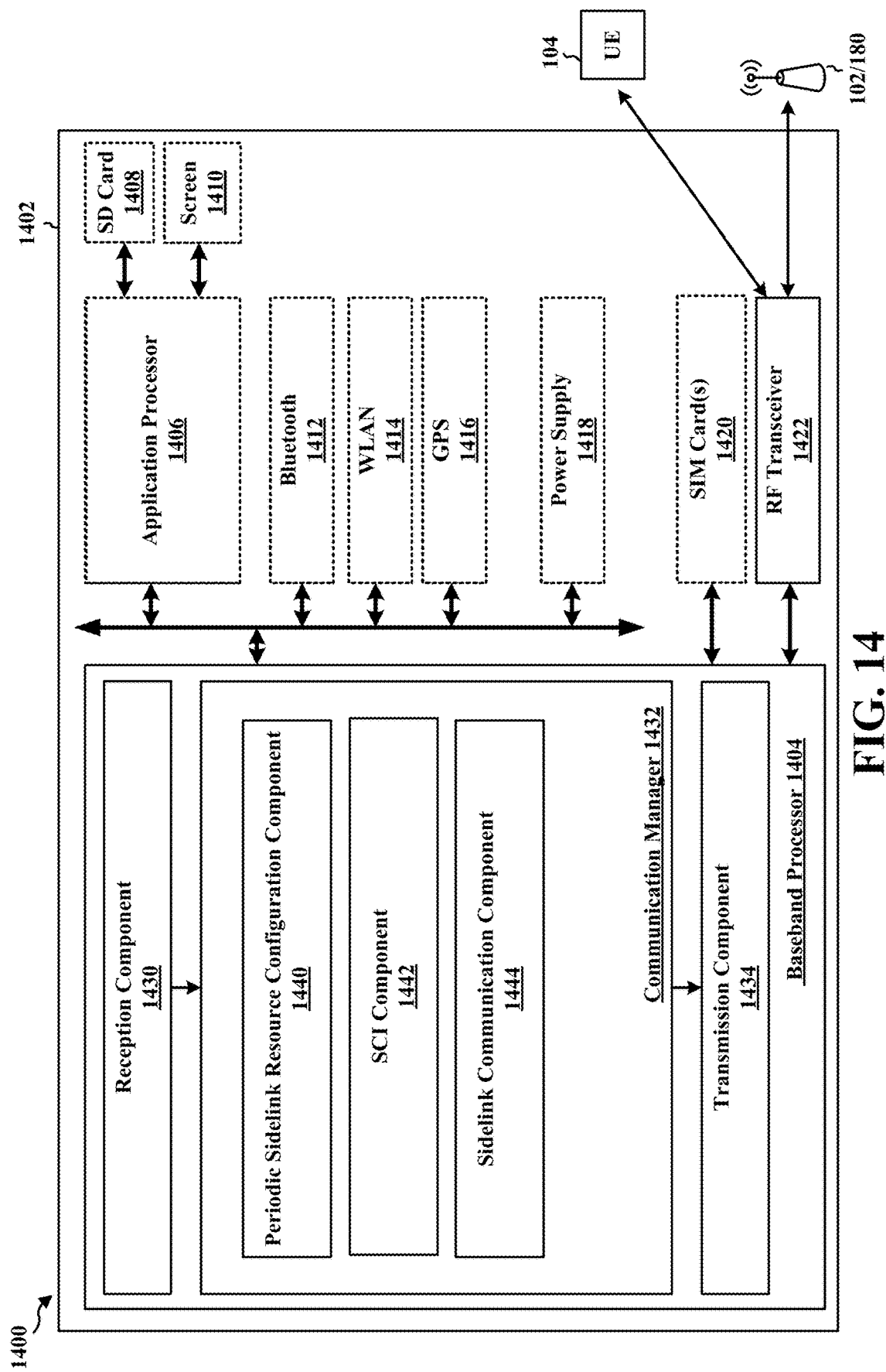
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a periodic sidelink resource configuration component 1440 that is configured to calculate the first offset for shifting the plurality of periodic sidelink resources, transmit and receive an activation of the plurality of periodic sidelink resources, and schedule a plurality of periodic sidelink resources with a first periodicity for communicating with a second UE at the first periodicity, e.g., as described in connection with 1006, 1008, 1010, 1012, 1110, and 1208. The communication manager 1432 includes an SCI component 1442 that is configured to transmit and receive the SCI including an indication of the plurality of periodic sidelink resources at the first periodicity, e.g., as described in connection with 1020, 1120, 1220, and 1320. The communication manager 1432 includes a sidelink communication component 1444 that is configured to transmit and receive a plurality of sidelink transmissions via the plurality of periodic sidelink resources at the first periodicity, e.g., as described in connection with 1022, 1120, 1220, and 1320.

The apparatus may include additional components that perform each of the blocks of the algorithm in the flowcharts of FIGS. 9, 10, 11, 12, and 13. As such, each block in the flowcharts of FIGS. 9, 10, 11, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for scheduling a plurality of periodic sidelink resources with a first periodicity for communicating at the first periodicity, the plurality of periodic sidelink resources being shifted at a first offset in a frequency domain, means for transmitting and receiving SCI including an indication of the plurality of periodic sidelink resources at the first periodicity, and means for transmitting and receiving a plurality of sidelink transmissions via the plurality of periodic sidelink resources at the first periodicity. The apparatus 1402 includes means for calculating the first offset for shifting the plurality of periodic sidelink resources, where the SCI includes the first offset and means for transmitting and receiving an activation of the plurality of periodic sidelink resources, where the activation indicates that the plurality of periodic sidelink resources is shifted at the first offset in the frequency domain. The apparatus 1402 includes means for shifting between a first set of subchannels and a second set of subchannels in the frequency domain, where the second set of subchannels are offset from the first set of subchannels by the first offset. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

A transmitting UE may perform resource hopping for a periodic sidelink resource reservation by scheduling a plurality of periodic sidelink resources with a first periodicity, the plurality of periodic sidelink resources being shifted at a first offset in a frequency domain. The transmitting UE may reduce persistent collision of periodic or SPS reservation of the sidelink resources with another UE. The transmitting UE may transmit, to a receiving UE, SCI indicating the first offset and the plurality of sidelink transmissions via the plurality of periodic sidelink resources at the first periodicity based on the SCI. The receiving UE may receive, from the transmitting UE, the SCI and the plurality of sidelink transmissions via the plurality of periodic sidelink resources at the first periodicity based on the SCI.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to schedule a plurality of periodic sidelink resources with a first periodicity for communicating with a second UE at the first periodicity, the plurality of periodic sidelink resources being shifted at a first offset in a frequency domain, transmit, to the second UE, SCI including an indication of the plurality of periodic sidelink resources at the first periodicity, and transmit, to the second UE, a plurality of sidelink transmissions via the plurality of periodic sidelink resources at the first periodicity.

Aspect 2 is the apparatus of aspect 1, where the plurality of periodic sidelink resources is periodically shifted at a second periodicity.

Aspect 3 is the apparatus of aspect 2, where the second periodicity is a multiple of the first periodicity.

Aspect 4 is the apparatus of any of aspects 1 to 3, where the first offset is based on at least one of a first physical layer source ID of the first UE or a total number of subchannels in a resource pool for the plurality of periodic sidelink resources.

Aspect 5 is the apparatus of aspect 4, where the first offset is calculated as mod($UE_{ID}$, K), where $UE_{ID}$ represents the first physical layer source ID of the first UE and K represents the total number of subchannels in the resource pool for the plurality of periodic sidelink resources.

Aspect 6 is the apparatus of any of aspects 4 and 5, where the SCI includes the first physical layer source ID of the first UE.

Aspect 7 is the apparatus of any of aspects 4 to 6, where the first offset is further based on a size of the subchannels allocated for each of the plurality of periodic sidelink resources.

Aspect 8 is the apparatus of aspect 7, where the first offset is calculated as mod($UE_{ID}$, K-n+1), where $UE_{ID}$ represents the first physical layer source ID of the first UE, K represents the total number of the subchannels in the resource pool for the plurality of periodic sidelink resources, and n represents the size of the subchannels allocated for each of the plurality of periodic sidelink resources.

Aspect 9 is the apparatus of any of aspects 7 and 8, where the first offset is further based on a second physical layer source ID of the second UE.

Aspect 10 is the apparatus of aspect 9, where the first offset is calculated as mod($UE_{ID}+UE_{ID\_D}$, K-n+1), where $UE_{ID}$ represents first physical layer source ID of the first UE, $UE_{ID\_D}$ represents the second physical layer source ID of the second UE, K represents the total number of the subchannels in the resource pool for the plurality of periodic sidelink resources, and n represents the size of subchannels allocated for each of the plurality of periodic sidelink resources.

Aspect 11 is the apparatus of any of aspects 1 to 10, where the at least one processor is further configured to calculate the first offset for shifting the plurality of periodic sidelink resources, where the SCI includes the first offset.

Aspect 12 is the apparatus of any of aspects 1 to 11, where the at least one processor is further configured to transmit, to the second UE, an activation of the plurality of periodic sidelink resources, where the activation indicates that the plurality of periodic sidelink resources is shifted at the first offset in the frequency domain.

Aspect 13 is the apparatus of aspect 12, where the activation is transmitted via at least one of a dedicated SCI-2 or a reserved bit in a SCI-1.

Aspect 14 is the apparatus of any of aspects 1 to 13, where, to schedule the plurality of periodic sidelink resources, the at least one processor is further configured to shift between a first set of subchannels and a second set of subchannels in the frequency domain, where the second set of subchannels are offset from the first set of subchannels by the first offset.

Aspect 15 is a method of wireless communication for implementing any of aspects 1 to 14.

Aspect 16 is an apparatus for wireless communication including means for implementing any of aspects 1 to 14.

Aspect 17 is a computer-readable medium storing computer executable code, where the code when executed by a processor causes the processor to implement any of aspects 1 to 14.

Aspect 18 is an apparatus for wireless communication including at least one processor coupled to a memory and configured to receive, from a first UE, SCI including an indication of a plurality of periodic sidelink resources at a first periodicity, the plurality of periodic sidelink resources being shifted at a first offset in a frequency domain, and receive, from the first UE, a plurality of sidelink transmissions via the plurality of periodic sidelink resources at the first periodicity.

Aspect 19 is the apparatus of aspect 18, where the plurality of periodic sidelink resources is periodically shifted at a second periodicity.

Aspect 20 is the apparatus of aspect 19, where the second periodicity is a multiple of the first periodicity.

Aspect 21 is the apparatus of any of aspects 18 to 20, where the first offset is based on at least one of a first physical layer source ID of the first UE or a total number of subchannels in a resource pool for the plurality of periodic sidelink resources.

Aspect 22 is the apparatus of aspect 21, where the first offset is calculated as mod($UE_{ID}$, K), where $UE_{ID}$ represents the first physical layer source ID of the first UE and K represents the total number of subchannels in the resource pool for the plurality of periodic sidelink resources.

Aspect 23 is the apparatus of any of aspects 21 and 22, where the SCI includes the first physical layer source ID of the first UE.

Aspect 24 is the apparatus of any of aspects 21 to 23, where the first offset is further based on a size of the subchannels allocated for each of the plurality of periodic sidelink resources.

Aspect 25 is the apparatus of aspect 24, where the first offset is calculated as mod($UE_{ID}$, K-n+1), where $UE_{ID}$ represents the first physical layer source ID of the first UE, K represents the total number of subchannels in the resource pool for the plurality of periodic sidelink resources, and n represents the size of the subchannels allocated for each of the plurality of periodic sidelink resources.

Aspect 26 is the apparatus of any of aspects 24 and 25, where the first offset is further based on a second physical layer source ID of the second UE.

Aspect 27 is the apparatus of aspect 26, where the first offset is calculated as mod($UE_{ID}+UE_{ID\_D}$, K-n+1), where $UE_{ID}$ represents first physical layer source ID of the first UE, $UE_{ID\_D}$ represents the second physical layer source ID of the second UE, K represents the total number of subchannels in the resource pool for the plurality of periodic sidelink resources, and n represents the size of subchannels allocated for each of the plurality of periodic sidelink resources.

Aspect 28 is the apparatus of any of aspects 18 to 27, where the SCI includes the first offset.

Aspect 29 is the apparatus of any of aspects 18 to 28, where the at least one processor is further configured to receive, from the first UE, an activation of the plurality of periodic sidelink resources, where the activation indicates that the plurality of periodic sidelink resources is shifted at the first offset in the frequency domain.

Aspect 30 is the apparatus of aspect 29, where the activation is received via at least one of a dedicated SCI-2 or a reserved bit in a SCI-1.

Aspect 31 is the apparatus of any of aspects 18 to 30, where, the plurality of periodic sidelink resources is shifted between a first set of subchannels and a second set of subchannels in the frequency domain, where the second set of subchannels are offset from the first set of subchannels by the first offset.

Aspect 32 is a method of wireless communication for implementing any of aspects 18 to 31.

Aspect 33 is an apparatus for wireless communication including means for implementing any of aspects 18 to 31.

Aspect 34 is a computer-readable medium storing computer executable code, where the code when executed by a processor causes the processor to implement any of aspects 18 to 31.

What is claimed is:

1. An apparatus for wireless communication at a first user equipment (UE), comprising:
   a memory; and
   at least one processor coupled to the memory, the at least one processor configured to, at least in part with the memory:
   schedule a plurality of periodic sidelink resources with a first periodicity for communicating with a second UE at the first periodicity, the plurality of periodic sidelink resources being shifted at a first offset in a frequency domain;
   transmit, to the second UE, sidelink control information (SCI) including an indication of the plurality of periodic sidelink resources at the first periodicity; and
   transmit, to the second UE, a plurality of sidelink transmissions via the plurality of periodic sidelink resources at the first periodicity.

2. The apparatus of claim 1, wherein the plurality of periodic sidelink resources is periodically shifted at a second periodicity.

3. The apparatus of claim 2, wherein the second periodicity is a multiple of the first periodicity.

4. The apparatus of claim 1, wherein the first offset is based on at least one of a first physical layer source identifier (ID) of the first UE or a total number of subchannels in a resource pool for the plurality of periodic sidelink resources.

5. The apparatus of claim 4, wherein the first offset is calculated as mod($UE_{ID}$, K), where $UE_{ID}$ represents the first physical layer source ID of the first UE and K represents the total number of subchannels in the resource pool for the plurality of periodic sidelink resources.

6. The apparatus of claim 4, wherein the SCI includes the first physical layer source ID of the first UE.

7. The apparatus of claim 4, wherein the first offset is further based on a size of the subchannels allocated for each of the plurality of periodic sidelink resources.

8. The apparatus of claim 7, wherein the first offset is calculated as mod($UE_{ID}$, K−n+1), where $UE_{ID}$ represents the first physical layer source ID of the first UE, K represents the total number of the subchannels in the resource pool for the plurality of periodic sidelink resources, and n represents the size of the subchannels allocated for each of the plurality of periodic sidelink resources.

9. The apparatus of claim 7, wherein the first offset is further based on a second physical layer source ID of the second UE.

10. The apparatus of claim 9, wherein the first offset is calculated as mod($UE_{ID}+U_{ID\_D}$, K−n+1), where $UE_{ID}$ represents first physical layer source ID of the first UE, $U_{ID\_D}$ represents the second physical layer source ID of the second UE, K represents the total number of the subchannels in the resource pool for the plurality of periodic sidelink resources, and n represents the size of subchannels allocated for each of the plurality of periodic sidelink resources.

11. The apparatus of claim 1, wherein the at least one processor is further configured to:
   calculate the first offset for shifting the plurality of periodic sidelink resources, wherein the SCI includes the first offset.

12. The apparatus of claim 1, wherein the at least one processor is further configured to:
   transmit, to the second UE, an activation of the plurality of periodic sidelink resources, wherein the activation indicates that the plurality of periodic sidelink resources is shifted at the first offset in the frequency domain.

13. The apparatus of claim 12, wherein the activation is transmitted via at least one of a dedicated second-stage SCI (SCI-2) or a reserved bit in a first-stage SCI (SCI-1).

14. The apparatus of claim 1, wherein, to schedule the plurality of periodic sidelink resources, the at least one processor is further configured to:

shift between a first set of subchannels and a second set of subchannels in the frequency domain, wherein the second set of subchannels are offset from the first set of subchannels by the first offset.

15. A method of wireless communication at a first user equipment (UE), comprising:

scheduling a plurality of periodic sidelink resources with a first periodicity for communicating with a second UE at the first periodicity, the plurality of periodic sidelink resources being shifted at a first offset in a frequency domain;

transmitting, to the second UE, sidelink control information (SCI) including an indication of the plurality of periodic sidelink resources at the first periodicity; and transmitting, to the second UE, a plurality of sidelink transmissions via the plurality of periodic sidelink resources at the first periodicity.

16. An apparatus for wireless communication at a second user equipment (UE), comprising:

a memory; and at least one processor coupled to the memory, the at least one processor configured to, at least in part with the memory:

receive, from a first UE, sidelink control information (SCI) including an indication of a plurality of periodic sidelink resources at a first periodicity, the plurality of periodic sidelink resources being shifted at a first offset in a frequency domain; and receive, from the first UE, a plurality of sidelink transmissions via the plurality of periodic sidelink resources at the first periodicity.

17. The apparatus of claim 16, wherein the plurality of periodic sidelink resources is periodically shifted at a second periodicity.

18. The apparatus of claim 17, wherein the second periodicity is a multiple of the first periodicity.

19. The apparatus of claim 16, wherein the first offset is based on at least one of a first physical layer source identifier (ID) of the first UE or a total number of subchannels in a resource pool for the plurality of periodic sidelink resources.

20. The apparatus of claim 19, wherein the first offset is calculated as $\mathrm{mod}(UE_{ID}, K)$, where $UE_{ID}$ represents the first physical layer source ID of the first UE and K represents the total number of subchannels in the resource pool for the plurality of periodic sidelink resources.

21. The apparatus of claim 19, wherein the SCI includes the first physical layer source ID of the first UE.

22. The apparatus of claim 19, wherein the first offset is further based on a size of the subchannels allocated for each of the plurality of periodic sidelink resources.

23. The apparatus of claim 22, wherein the first offset is calculated as $\mathrm{mod}(UE_{ID}, K-n+1)$, wherein $UE_{ID}$ represents the first physical layer source ID of the first UE, K represents the total number of subchannels in the resource pool for the plurality of periodic sidelink resources, and n represents the size of the subchannels allocated for each of the plurality of periodic sidelink resources.

24. The apparatus of claim 22, wherein the first offset is further based on a second physical layer source ID of the second UE.

25. The apparatus of claim 24, wherein the first offset is calculated as $\mathrm{mod}(UE_{ID}+UE_{ID\_D}, K-n+1)$, where $UE_{ID}$ represents first physical layer source ID of the first UE, $UE_{ID\_D}$ represents the second physical layer source ID of the second UE, K represents the total number of subchannels in the resource pool for the plurality of periodic sidelink resources, and n represents the size of subchannels allocated for each of the plurality of periodic sidelink resources.

26. The apparatus of claim 16, wherein the SCI includes the first offset.

27. The apparatus of claim 16, wherein the at least one processor is further configured to:

receive, from the first UE, an activation of the plurality of periodic sidelink resources, wherein the activation indicates that the plurality of periodic sidelink resources is shifted at the first offset in the frequency domain.

28. The apparatus of claim 27, wherein the activation is received via at least one of a dedicated second-stage SCI (SCI-2) or a reserved bit in a first-stage SCI (SCI-1).

29. The apparatus of claim 16, wherein, the plurality of periodic sidelink resources is shifted between a first set of subchannels and a second set of subchannels in the frequency domain, wherein the second set of subchannels are offset from the first set of subchannels by the first offset.

30. A method of wireless communication at a second user equipment (UE), comprising:

receiving, from a first UE, sidelink control information (SCI) including an indication of a plurality of periodic sidelink resources at a first periodicity, the plurality of periodic sidelink resources being shifted at a first offset in a frequency domain; and receiving, from the first UE, a plurality of sidelink transmissions via the plurality of periodic sidelink resources at the first periodicity.

* * * * *